US007017123B2

(12) United States Patent
Chickles et al.

(10) Patent No.: US 7,017,123 B2
(45) Date of Patent: Mar. 21, 2006

(54) GRAPHICAL USER INTERFACE INCLUDING PALETTE WINDOWS WITH AN IMPROVED SEARCH FUNCTION

(75) Inventors: Justin Chickles, Somerville, MA (US); Raghavendra Gururaj, Dunwoody, GA (US)

(73) Assignee: National Instruments Corporation, Austin, TX (US)

( * ) Notice: Subject to any disclaimer, the term of this patent is extended or adjusted under 35 U.S.C. 154(b) by 637 days.

(21) Appl. No.: 09/894,660

(22) Filed: Jun. 28, 2001

(65) Prior Publication Data

US 2002/0080157 A1   Jun. 27, 2002

Related U.S. Application Data

(63) Continuation-in-part of application No. 09/752,654, filed on Dec. 27, 2000.

(51) Int. Cl.
*G06F 3/00* (2006.01)
(52) U.S. Cl. .............. 715/816; 715/853; 715/851; 715/771; 715/769; 707/3
(58) Field of Classification Search ........... 345/769, 345/853, 854, 851, 810, 737, 738, 762, 763; 717/104, 105; 715/816, 853, 851, 771, 769, 715/760, 517; 707/3; 709/316
See application file for complete search history.

(56) References Cited

U.S. PATENT DOCUMENTS

| | | | |
|---|---|---|---|
| 5,481,741 A | 1/1996 | McKaskle et al. | |
| 5,613,122 A | 3/1997 | Burnard et al. | |
| 5,630,125 A | 5/1997 | Zellweger | |
| 5,664,129 A * | 9/1997 | Futatsugi et al. | ........... 345/764 |
| 6,014,138 A | 1/2000 | Cain et al. | |
| 6,061,061 A * | 5/2000 | Conrad et al. | .............. 345/781 |
| 6,081,814 A * | 6/2000 | Mangat et al. | .............. 707/501 |
| 6,148,311 A | 11/2000 | Wishnie et al. | |
| 6,177,936 B1 * | 1/2001 | Cragun | ........................ 345/781 |
| 6,189,138 B1 * | 2/2001 | Fowlow et al. | ................. 717/1 |
| 6,212,494 B1 | 4/2001 | Boguraev | |
| 6,301,586 B1 | 10/2001 | Yang et al. | |
| 6,353,840 B1 * | 3/2002 | Saito et al. | .................. 715/517 |
| 6,405,216 B1 | 6/2002 | Minnaert et al. | |
| 6,429,880 B1 * | 8/2002 | Marcos et al. | .............. 345/744 |
| 6,489,975 B1 * | 12/2002 | Patil et al. | ................... 345/803 |
| 6,615,237 B1 | 9/2003 | Kyne et al. | |
| 6,760,890 B1 * | 7/2004 | Makinen | ........................ 716/4 |
| 6,813,746 B1 | 11/2004 | O'Shea | |
| 6,862,601 B1 * | 3/2005 | Doney et al. | ................ 707/101 |
| 2002/0032782 A1 * | 3/2002 | Rangan et al. | .............. 709/229 |
| 2003/0035003 A1 * | 2/2003 | Marcos et al. | .............. 715/760 |
| 2004/0003132 A1 * | 1/2004 | Stanley et al. | .............. 709/316 |

\* cited by examiner

*Primary Examiner*—Ba Huynh
*Assistant Examiner*—Mylin Tran
(74) *Attorney, Agent, or Firm*—Meyertons Hood Kivlin Kowert & Goetzel, P.C.; Jeffrey C. Hood

(57) ABSTRACT

A system and method for searching for items in a hierarchy of palette windows and for incorporating located items into programs. Palette windows may include one or more palette window selection items that, when selected, open child palette windows of the current palette window. Palette windows may include one or more items for navigating in the hierarchy. A search mechanism for locating palette windows and/or palette window content may be provided. From the search mechanism, the user may locate and open palette windows in one or more hierarchies. The user may also incorporate palette window content into something, for example, a program being edited in a graphical programming environment. In one embodiment, the user may drag-and-drop palette window content onto a window being edited.

54 Claims, 18 Drawing Sheets

GRAPHICAL USER INTERFACE INCLUDING PALETTE WINDOWS WITH AN IMPROVED SEARCH FUNCTION

CONTINUATION DATA

This application is a Continuation-In-Part of U.S. utility application Ser. No. 09/752,654 titled "Graphical User Interface Including Palette Windows with an Improved Navigation Interface" filed Dec. 27, 2000, whose inventors were Justin Chickles and Raghavendra Gururaj.

RESERVATION OF COPYRIGHT

A portion of the disclosure of this patent document contains material to which a claim of copyright protection is made. The copyright owner has no objection to the facsimile reproduction by anyone of the patent document or the patent disclosure as it appears in the Patent and Trademark Office patent file or records, but reserves all other rights whatsoever.

FIELD OF THE INVENTION

The present invention relates to the field of computer user interface design, and in particular to an improved user interface for searching for items in a hierarchy of palette windows and for incorporating located items into programs.

DESCRIPTION OF THE RELATED ART

A primary goal of a graphical user interface (GUI) is to provide the user the maximum amount of intuitiveness, familiarity and flexibility in navigating among the components of the GUI. Some GUIs include one or more palette windows which each contain a plurality of items that may be selected. For example, a user may select one or more items in a palette window for use in a user interface being created, for inclusion in a computer program being created, or for other purposes. Some GUIs also include a hierarchy of palette windows, wherein a palette window may include a palette window selection item that, when selected, displays a lower palette window ("child palette window") in the hierarchy. A user may select a palette window selection item in a palette window to view a palette window lower in the hierarchy.

As one example, National Instruments' LabVIEW graphical programming system includes a hierarchy of palette windows for enabling a user to select front panel controls and indicators for inclusion in a front panel or user interface being created. Similarly, the LabVIEW system also includes a hierarchy of palette windows for enabling a user to select nodes for inclusion in a graphical program block diagram being created.

Prior art methods of accessing a hierarchy of palette windows for use in selecting or adding items have generally relied on window technology that displays multi-tiered, hierarchical windows, i.e., top level, level 1, level 2, level 3 windows, sub-windows, etc. Typically, when a lower-level window is selected from a higher-level window, at least a portion of the higher-level window remains displayed on the display screen. This method may be cumbersome for displaying windows for adding content items several levels deep in the hierarchy. In addition, there has been no mechanism provided for enabling a user to browse a hierarchy of palette windows in a browser-based fashion.

FIGS. 4A–4C illustrate a prior art method for accessing a hierarchy of palette windows. FIGS. 4A–4C illustrate a prior art example of a hierarchy of palette windows from the LabVIEW graphical programming environment. Program elements, including user interface elements such as controls and indicators (e.g. ActiveX controls, buttons, switches, graphs, gauges, etc.), may be added to a software application under development by using the exemplary palette windows 100 as illustrated in FIGS. 4A–4C. Palette windows 100 as illustrated in FIG. 4A may include one or more items which may include palette window selection items 108 (for example, graph palette window selection item 108A of FIG. 4A), and palette items. Exemplary palette items include program elements 112 (for example, user interface element 112A of FIG. 4B), or utility items 110 (for example, utility item 110A of FIG. 4A). Each item may include a graphical or textual indication of the type of item it is, and may include graphical and/or textual indications of the palette window, program element, etc. that it represents.

Upon selecting palette window selection item 108A of palette window 100A, for example, by clicking or double-clicking the item, a second palette window 100B is displayed as illustrated in FIG. 4B. In this example, palette window 100A may be described as a parent of palette window 100B, and palette window 100B as a child of palette window 100A. Palette window 100B may partially cover or overlap palette window 100A, which remains displayed. In this example, items in palette window 100B may be related to adding graph functionality to a program currently being created or modified.

Upon selecting palette window selection item 108B of palette window 100B, a third palette window 100C is displayed as illustrated in FIG. 4C. In this example, palette window 100B may be described as a parent of palette window 100C, and palette window 100C as a child of palette window 100B. In this example, items in palette window 100C may be related to adding picture graphs to a program currently being created or modified. In this example, user interface element 112B may be added to a user interface window in a program currently being created or modified, for example, by dragging and dropping the item on the user interface window. Palette window 100C may also include one or more palette window selection items 108, for example, item 108C, that, when selected, may display further child palette windows 100 of palette window 100C. Note that previously opened palette windows 100 in the hierarchy remain displayed when a child palette window of a current palette window is opened. Also, by selecting other palette window selection items 108 on one of the palette windows 100, other branches of the hierarchy of palette windows may be displayed.

Prior art methods also do not provide for easily locating a particular item among a hierarchy of palette windows. For larger programs, the hierarchy of palette windows may include several hundred items. The prior art methods may be inadequate to allow the user to search through the items for a specific keyword or item name and to navigate to a palette window including a desired item. The prior art methods also may be inadequate in allowing the user to incorporate located items directly into a program being edited in the graphical user interface. Therefore, it is desirable to provide an improved method or methods for searching for items in a hierarchy of palette windows in a graphical user interface and for allowing located items to be incorporated directly into programs.

SUMMARY OF THE INVENTION

One embodiment of the present invention provides a system and method for presenting a graphical user interface (GUI) having one or more hierarchies of palette windows, wherein the GUI includes an improved navigation interface for the palette windows. As used herein, a palette window may include the notion of a window (e.g. dialog window) displayed by a program which may include one or more items from which a user may select. A palette window may include palette items that may be selected by a user to add some functionality, capability or element to a program. A palette window may also include one or more palette window selection items for selecting child palette windows in the hierarchy. The palette windows in the hierarchy preferably include an improved navigation interface for navigating among windows in the hierarchy.

Embodiments of the present invention may be used in any of various types of programs or applications which use a hierarchy (or hierarchies) of palette windows. One example where the invention may be used is a hierarchy of palette windows that include user interface elements that may be selected for inclusion in a graphical user interface being created. Another example where the invention may be used is a hierarchy of palette windows that include nodes that may be selected for inclusion in a graphical program being created. Thus example applications that may use hierarchies of palette windows as disclosed herein include, but are not limited to, programs for creating a graphical user interface and programs for creating a graphical program.

In one embodiment, a palette window in the hierarchy of palette windows may be displayed or opened. In one embodiment the user may directly open a palette window through the application's user interface, such as by selecting a menu item. The palette window may also be automatically opened when the user performs another function, such as opening a window to create something that uses palette items contained in the hierarchy of palette windows. For example, in creation of a GUI, when the user opens a blank GUI window to begin creating the GUI, a parent palette window in the hierarchy of palette windows may be displayed. As another example, in creation of a block diagram of a graphical program, when the user opens a blank block diagram window to begin creating the block diagram, the parent palette window in the hierarchy of palette windows may be displayed.

Palette windows may include various items, including palette items and palette window selection items. Palette items may be selectable from a palette window to perform various program functions or may be selectable for inclusion in something being created. As noted above, palette window selection items may be selected to display child palette windows in the hierarchy. Some palette windows in a hierarchy may comprise only palette window selection items. Other palette windows (e.g. the lowest palette windows in the hierarchy) may comprise only palette items and not include any palette window selection items. Other windows may comprise a combination of palette window selection items and other types of items. For example, in one embodiment of a graphical programming application, palette windows may include palette window selection items and may also include palette items that comprise selectable program elements such as user interface elements and/or function nodes. The user interface elements or program elements may be selected and added to user interface or block diagram windows of a program being created or edited. Unlike the palette items, the palette window selection items are not added to user interface or block diagram windows when selected, but rather cause the display of lower level or child palette windows.

In one embodiment, palette windows in the hierarchy may include one or more navigation items for navigating among the hierarchy of palette windows. In one embodiment, the navigation items may be comprised in a navigation toolbar. In one embodiment, the navigation items may include one or more of a back navigation item, a forward navigation item, and an up navigation item. The navigation items may resemble "back" and "forward" arrows in a convention web browser. Thus the navigation items may present a browser type interface for navigating among the hierarchy of palette windows, similar to a web browser.

In one embodiment, a mechanism for searching for palette windows and/or palette window content (e.g. palette items such as program elements and palette window selection items) may be provided. In one embodiment, a search window may be opened from any of the palette windows in the hierarchy. The search window may provide an interface to allow the user to search for and locate palette windows and/or palette window content in the hierarchy. From the search window, the user may directly open located palette windows in the hierarchy. In embodiments including more than one hierarchy of palette windows, the search mechanism may allow a user to navigate from one hierarchy to another. For example, the user may open the search window from a first palette window in a first hierarchy, search for and locate a second palette window in a second hierarchy, and open the second palette window.

In one embodiment, palette items may be selectable from the search window to perform various program functions or may be selectable for inclusion in something being created, for example, a program in a graphical programming environment. A search window may be displayed on a computer display on which a program is being edited in the graphical user interface. A user may enter search criteria into the search window. The system may then search for and display located items indicated by the search criteria. These located items may include one or more items related to program elements that may be incorporated in a program being edited to add functionality to the program. The user may then select one or more located program elements and incorporate the one or more program elements in one or more windows of the program being edited. In one embodiment, a program element may be incorporated into the program by selecting the item and "dragging and dropping" the item on a window of the program. Other methods of incorporating items into programs may be used. Thus, the search results displayed in the search window may include program elements that can be selected and incorporated directly from the search window into a window of the program being edited.

One embodiment of the invention may thus provide a hierarchy of palette windows that may be navigated in a manner similar to a web browser, wherein at most one palette window in a hierarchy is displayed at one time, and navigation items may provide a web browser type interface. The navigation interface described herein also provides improved navigation features over conventional web browsers, including improved search capabilities and improved browsing among and between hierarchies of panels.

BRIEF DESCRIPTION OF THE DRAWINGS

A better understanding of the present invention can be obtained when the following detailed description of various embodiments is considered in conjunction with the following drawings, in which.

Figure 1A:
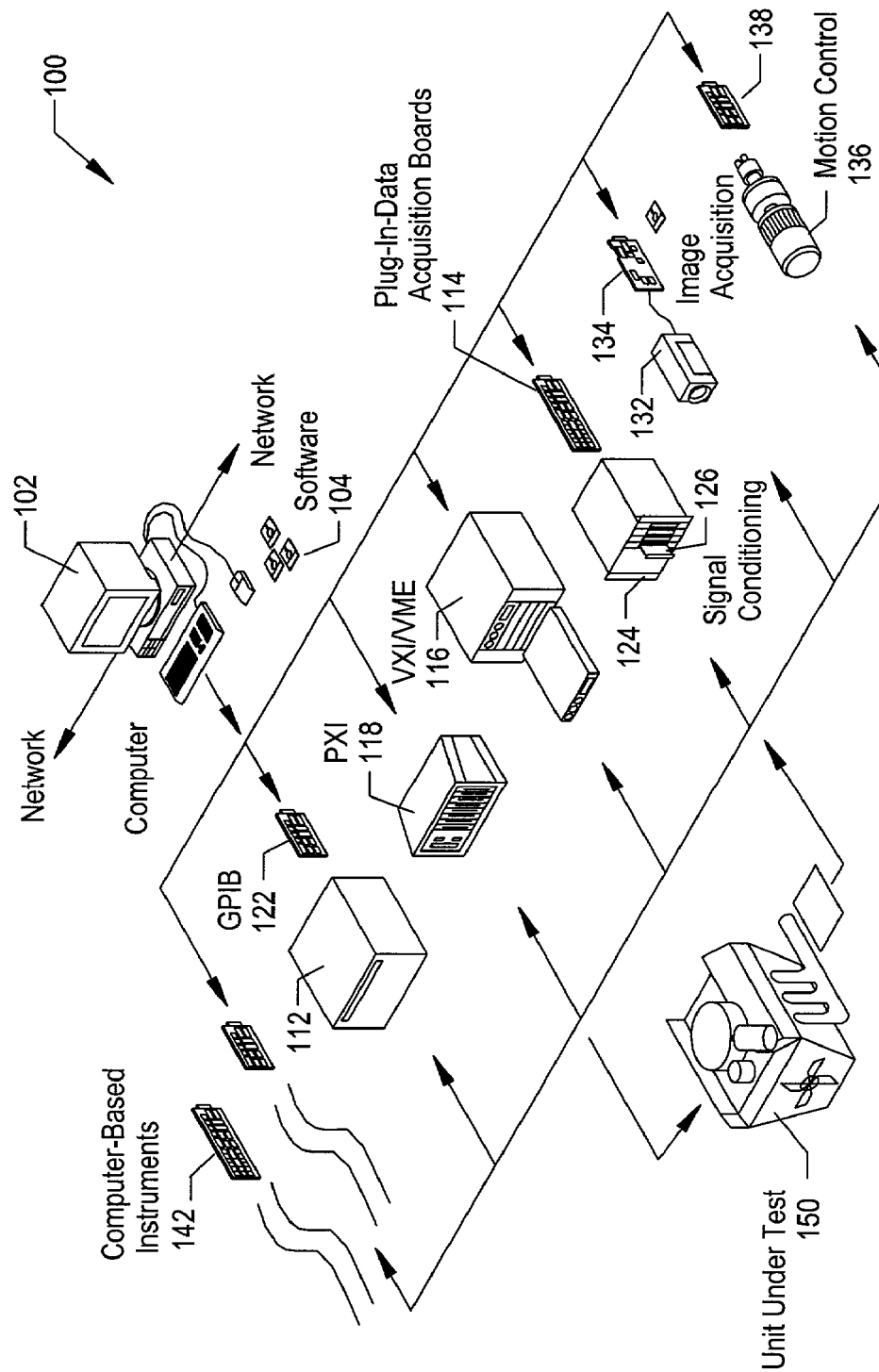
FIGS. 1A and 1B illustrate exemplary instrumentation and industrial automation systems.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims.

DETAILED DESCRIPTION OF SEVERAL EMBODIMENTS

Embodiments of the present invention may be used in any of various types of programs or applications that use one or more hierarchies of palette windows to provide a user interface for selecting among various features or functions of the program or application. Embodiments of the invention may be used in an operating system, or in application programs. One exemplary application that may use a hierarchy (or hierarchies) of palette windows is an application for creating a graphical user interface (GUI). For example, the palette windows may include different user interface elements that may be selected for inclusion in the GUI being created. As another example, the hierarchy of palette windows may include different application programs or functions that may be selected. For example, an operating system may include one or more hierarchies of palette windows for selecting programs or functions within the operating system.

Another example application that may use a hierarchy (or hierarchies) of palette windows is a graphical programming development application. A graphical programming development application provides a graphical user interface (GUI) that enables users of the application to graphically create and/or edit graphical computer programs. A graphical program may include a block diagram and may optionally include a user interface. In this example, one hierarchy of palette windows may include nodes that may be selected for inclusion in the block diagram, and a second hierarchy of palette windows may include user interface elements that may be selected for inclusion in the user interface of the graphical program.

An example of a graphical programming environment is National Instruments' LabVIEW, which provides a graphical user interface that allows the user to create and/or edit graphical programs. LabVIEW includes functionality targeted toward creation of graphical programs, referred to as virtual instruments (VIs), for instrumentation and automation applications. The following describes an exemplary embodiment of the present invention used in a LabVIEW graphical programming development system. Thus the exemplary systems shown below are instrumentation and automation systems. Also, many of the screen shots used to illustrate the embodiments are representative of graphical programming environments similar to the LabVIEW graphical programming environment. It is noted, however, that embodiments of the present invention may be applied to any computer-executable program that uses one or more hierarchies of palette windows. Also, embodiments of the present invention may be used in any of various applications, and are not limited to instrumentation and automation applications.

Figure 1B:
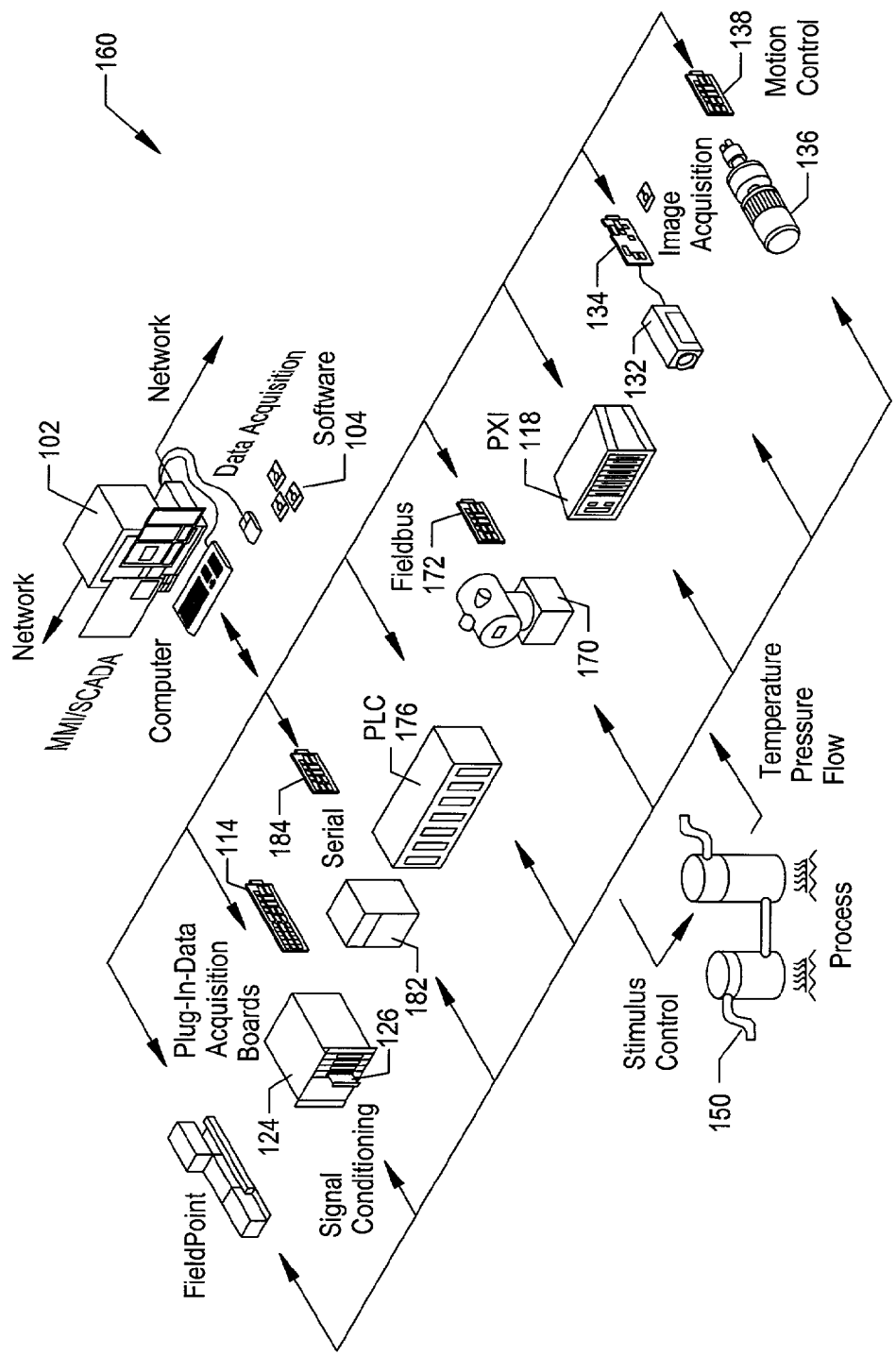

FIGS. 1A and 1B—Instrumentation and Industrial Automation Systems

FIGS. 1A and 1B illustrate exemplary systems which may utilize software according to one embodiment of the invention. FIGS. 1A and 1B illustrate systems targeted for instrumentation, industrial automation, or other purposes.

FIG. 1A illustrates an instrumentation control system 100. The system 100 comprises a host computer 102, which connects to one or more instruments. The host computer 102 may comprise a CPU, a display, memory, and one or more input devices such as a mouse or keyboard as shown. The computer 102 may connect through the one or more instruments to analyze, measure, or control a unit under test (UUT) or process 150. The host computer 102 may store computer programs for creating or editing a graphical program, such as a graphical program, which interacts with or controls the one or more instruments.

The one or more instruments may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The instruments may be coupled to the unit under test (UUT) or process 150, or may be coupled to receive field signals, typically generated by transducers. The system 100 may be used in a data acquisition and control application, in a test and measurement application, a process control application, or a man-machine interface application.

FIG. 1B illustrates an exemplary industrial automation system 160. The industrial automation system 160 is similar to the instrumentation or test and measurement system 100 shown in FIG. 1A. Elements, which are similar or identical to elements in FIG. 1A, have the same reference numerals for convenience. The system 160 comprises a computer 102, which connects to one or more devices or instruments. The computer 102 may comprise a CPU, a display screen, memory, and one or more input devices such as a mouse or keyboard as shown. The computer 102 may connect through the one or more devices to a process or device 150 to perform an automation function, such as MMI (Man Machine Interface), SCADA (Supervisory Control and Data Acquisition), portable or distributed data acquisition, process control, advanced analysis, or other control. In FIG. 1B, the computer 102 may store computer programs for creating or editing a graphical program, such, such as a graphical program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices. The devices may be coupled to the device or process 150.

In typical instrumentation and/or industrial automation systems a device will not be present of each interface type, and in fact many systems may only have one or more devices of a single interface type.

Referring again to FIGS. 1A and 1B, the computer system 102 preferably includes a memory medium on which one or more computer programs are stored. The one or more programs may include user interfaces implementing one or more hierarchies of palette windows. The one or more hierarchies of palette windows may include an improved navigation interface according to one embodiment of the present invention. The improved navigation interface may provide browser-type navigation items as described herein that may provide an interface similar to an Internet web browser. The improved navigation interface may provide that at most one palette window in a hierarchy is displayed at one time, and may include improved search capabilities, among other features described herein.

The term "memory medium" is intended to include an installation medium, e.g., a CD-ROM, floppy disks 104, or tape device, a computer system memory or random access memory (RAM) such as DRAM, SRAM, EDO RAM, Rambus RAM, etc., or a non-volatile memory such as a magnetic media, e.g., a hard drive, or optical storage. The memory medium may comprise other types of memory as well, or combinations thereof.

In addition, the memory medium may be located in a first computer in which the programs are executed, or may be located in a second different computer, which connects to the first computer over a network, such as the Internet. In the latter instance, the second computer provides the program instructions to the first computer for execution. Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having at least one processor, which executes instructions from a memory medium.

As noted above, in the exemplary embodiment described herein, the one or more hierarchies of palette windows include palette items used in creating a graphical program. The graphical program that is created may be designed for data acquisition/generation, analysis, and/or display, and for controlling or modeling instrumentation or industrial automation hardware. An exemplary graphical programming development system that may be used to develop the graphical program is the National Instruments LabVIEW graphical programming application. LabVIEW provides specialized support for developers of instrumentation and industrial automation applications.

However, it is noted that the present invention may be used in a plethora of applications and is not limited to graphical programming applications including instrumentation or industrial automation applications. In other words, FIGS. 1A and 1B are exemplary only, and embodiments of the present invention may be used in any of various types of systems or applications that use one or more hierarchies of palette windows.

Figure 2:
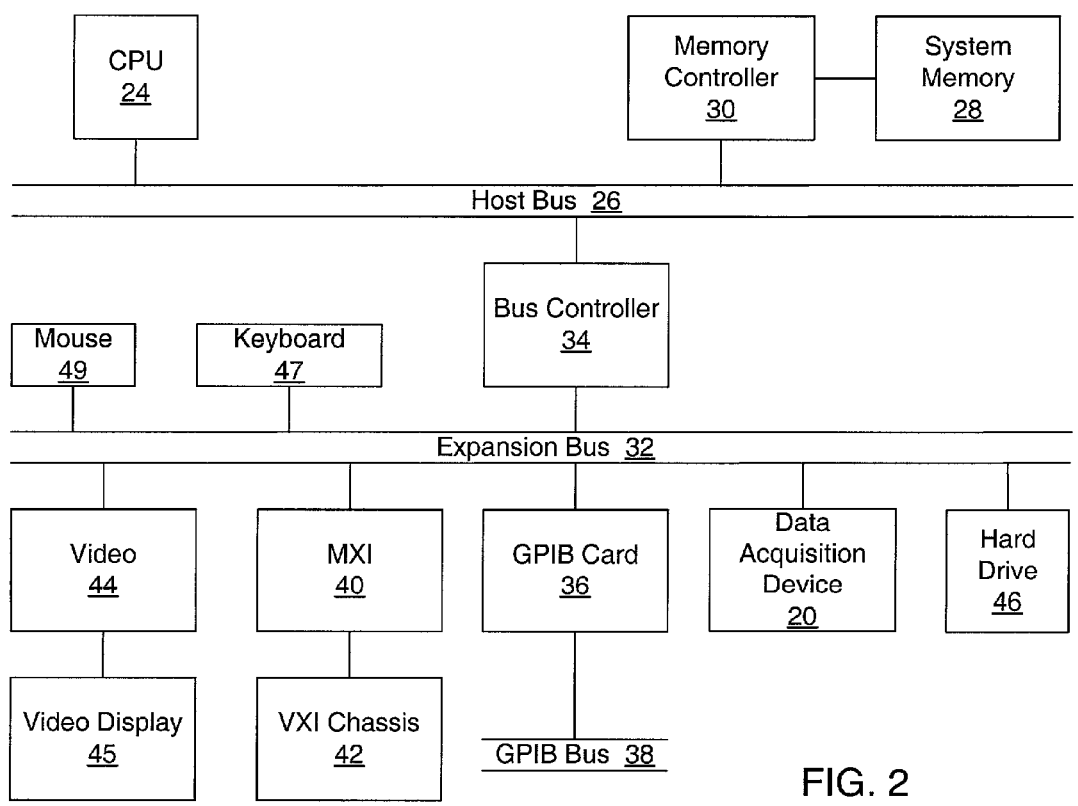
FIG. 2 illustrates a computer system block diagram according to one embodiment.

FIG. 2—Computer System Block Diagram

FIG. 2 is a block diagram of the exemplary computer system illustrated in FIGS. 1A and 1B. It is noted that any type of computer system configuration or architecture can be used as desired, and FIG. 2 illustrates a representative PC embodiment. The elements of a computer not necessary to understand the present invention have been omitted for simplicity.

The computer 102 includes at least one central processing unit or CPU 160 that is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The main memory 166 stores computer programs according to one embodiment. More particularly, in this embodiment, the main memory 166 may store a graphical programming development system which includes a user interface having one or more hierarchies of palette windows. The main memory 166 also stores operating system software as well as other software for operation of the computer system, as well known to those skilled in the art. The computer programs of one or more embodiments will be discussed in more detail below.

The host bus 162 may be coupled to an expansion or input/output bus 170 by means of a bus controller 168 or bus bridge logic. The expansion bus 170 of this embodiment may be the PCI (Peripheral Component Interconnect) expansion bus, although other bus types can be used. The expansion bus 170 includes slots for various devices such as the data acquisition board 114 (of FIG. 2A), a GPIB interface card 122 which provides a GPIB bus interface to the GPIB instrument 112 (of FIG. 2A), and a VXI or MXI bus card 186 coupled to the VXI chassis 116 for receiving VXI instruments. The computer 102 further comprises a video display subsystem 180 and hard drive 182 coupled to the expansion bus 170.

Figure 3:
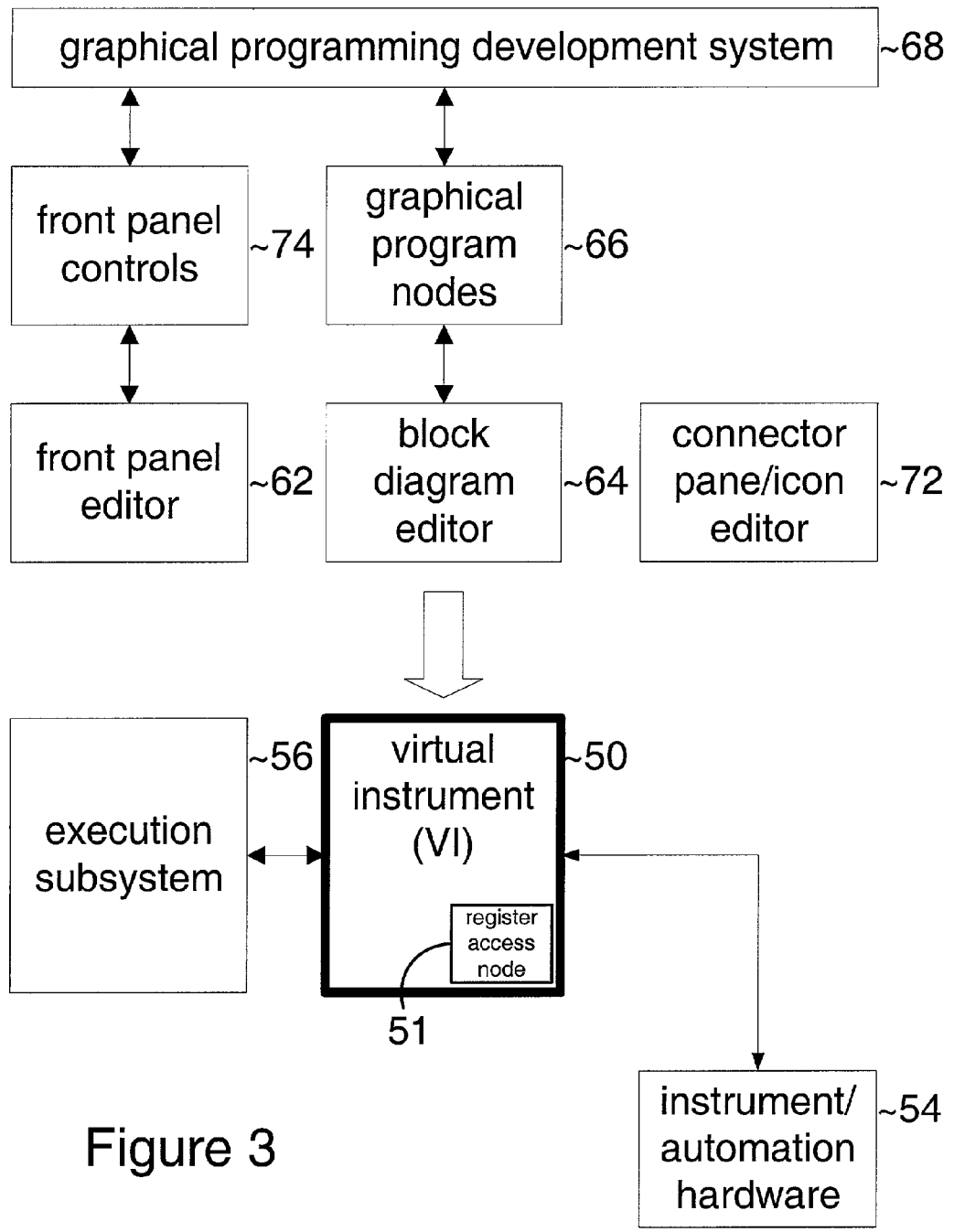
FIG. 3 is a block diagram illustrating the relationship of portions of the instrumentation and industrial automation systems according to one embodiment.

FIG. 3—Graphical Programming Environment

FIG. 3 is a block diagram illustrating one embodiment of the relationship of portions of an exemplary instrumentation control system 100 (of FIG. 1A) or the automation system 160 (FIG. 1B). The elements shown in FIG. 3 (with the exception of the instrument hardware 54) may be software elements, which are executed on the computer 102 (of FIGS. 1A or 1B). The exemplary system described herein may be used to create a graphical program, or graphical program portion, to provide an interface to one or more instruments connected to the computer system on which the program is executed.

The block diagram editor 64 is operable to create a block diagram or VI 50, and the front panel editor 62 is operable to create a front panel or user interface. A graphical program comprises the block diagram and may also comprise the front panel. The block diagram editor 64 communicates with the graphical program nodes 66, which in turn communicate with the graphical programming development system 68. In a similar manner, the front panel editor 62 communicates with the front panel controls 74, which in turn communicate with the graphical programming development system 68.

A programmer may employ the front panel editor 62, the block diagram editor 64, and a connector pane/icon editor 72 of a graphical programming system to produce a graphical program. In the exemplary instrumentation application, the graphical program may be referred to as a virtual instrument (VI) 50. The VI 50 may include one or more nodes or blocks that may be connected or coupled together as specified by the user.

The graphical programming environment comprises one or more graphical program nodes 66 that may be selected for inclusion in a graphical program block diagram. The block diagram editor 64 may include one or more palette windows which include nodes 66 (or icons representing the nodes) that may be selected for inclusion in the block diagram being created. The block diagram editor 64 may also generate executable instructions, i.e., machine language instructions, in response to the VI 50. The VI 50 developed by the programmer is executed by an execution subsystem 56 of the graphical programming environment to control an instrument 54. The instrument 54 is illustrative of instruments such as those of FIG. 1.

Referring again to FIG. 3, the graphical programming environment further comprises one or more front panel controls or graphical user interface (GUI) elements 74. The front panel editor 62 is operable to generate a front panel or GUI using one or more of the controls 74. The front panel editor 62 may include one or more palette windows that include user interface elements or controls 74 (icons representing the controls) that may be selected for inclusion in the front panel or user interface being created.

The graphical programming environment may further comprise a connector pane/icon editor 72 for forming VI's into subVI's, i.e., a VI 50 that may be used as a graphical programming element in another VI. The reader is referred to U.S. Pat. No. 5,301,336 for more information about the subVI's and the icon editor 72.

The execution subsystem 56 executes the executable instructions constructed from a block diagram and/or front panel of the VI 50. For more information about the graphical programming development system, please see U.S. Pat. No. 5,481,741, which is hereby incorporated by reference as though fully and completely set forth herein.

FIGS. 5A–10—Improved Palette Window Navigation

Various types of computer programs may include one or more hierarchies of palette windows comprising an embodiment of the invention as described herein. For example, a software program may be launched to perform a task. The software program may display palette windows from a hierarchy of palette windows that provide a user interface to various aspects of the program. In one embodiment, the software program may be a graphical programming application that allows the user to graphically create and/or edit computer-executable programs. FIGS. 5A–10 illustrate an exemplary graphical programming environment in which the various aspects of the present invention may be implemented. It is noted, however, that the various aspects of the present invention may be applied to any computer-executable program or application that uses one or more hierarchies of palette windows.

In one embodiment, one or more palette windows may be opened automatically in response to a program action, such as the opening of a window related to the elements in the palette windows. For example, in the exemplary graphical programming environment, opening a user interface window and/or a function block diagram window may result in one or more palette windows being automatically opened. Alternatively, the user may open palette windows through an application's user interface, for example, by choosing a menu item to select and/or display one or more palette windows.

An exemplary graphical programming application may open one or more windows, which may include user interface windows and/or block diagram windows, upon launch of the application. Alternatively, user interface windows and/or block diagram windows may be opened by the user subsequent to the launching of the application using the application's user interface. A user may add, delete or modify various user interface elements in a user interface window. User interface elements, e.g. controls and indicators, may represent or display various inputs and outputs of the graphical program, and/or may represent interfaces to items, for example, device interfaces in a virtual instrument (VI) program. The user interface window may also include user interface elements that, when selected, open or display one or more other user interface windows for accessing other aspects of the graphical program.

A block diagram window may include one or more function nodes or program elements, such as terminals, that may correspond to user interface elements in a user interface window and nodes that embody a function. The nodes or function elements may represent executable functions or executable software modules. The nodes or function elements may be interconnected or "wired up" to visually indicate functionality of the graphical program, wherein the nodes perform various operations during execution of the graphical program.

A palette window may include palette items (also called "program elements") and palette window selection items.

Palette items may be selectable to perform various program functions, e.g., palette items may be selected to display the corresponding icon in a window or may be selected to perform a desired function. Palette items may be represented graphically or as text items, for use in constructing windows, for example, graphical user interface windows and block diagram windows. In one embodiment, a palette item may be placed on a window by selecting the item in a palette window, and "dragging and dropping" the item on the window. Other methods of adding items to windows may be used. For example, in one embodiment, a user may select an item in a palette window, and a menu choice may then be selected to add the selected item to a window.

In a hierarchy of palette windows used in creating a graphical user interface in the graphical user interface window, the palette items in the palette windows may include user interface elements to be displayed in the graphical user interface window. In one embodiment, user interface elements may be classified into two main groups: control (input) items, and indicator (output) items. Some items may support both input and output. Examples of control and indicator items that may be included in a palette window include, but are not limited to: Boolean interface items such as switches and buttons; 2- and 3-dimensional graphs and charts; textual items such as text fields, lists and tables; and numeric interface items such as gauges, digital controls, analog controls such as knobs, etc.

In a hierarchy of palette windows used in creating a block diagram in the block diagram window, the palette items in the palette windows may include functions nodes (also called function elements or primitives) to be displayed in the block diagram window. Examples of types of function elements may include, but are not limited to: program structures such as for and while loops, case statements, and global or local variables; operators such as numeric (addition, multiplication, etc.), comparison (equal to, greater than, etc) and logical (AND, OR, XOR, etc) operators; file I/O items; signal or waveform processing function elements; complex mathematical function elements; instrument driver items; communications items; and graphical or sound items.

Some embodiments may include a plurality of hierarchies of palette windows. For example, in the exemplary graphical programming environment, a first hierarchy may include user interface elements for use in creating a user interface, and a second hierarchy may include function elements or nodes for use in creating a block diagram.

Individual palette windows may include related groups of elements. For example, in the exemplary graphical programming environment, in the first hierarchy a first palette window may include graph and chart user interface elements, a second palette window may include Boolean user interface elements, and a third palette window may include digital user interface elements, etc. In a similar manner, in the second hierarchy a first palette window may include numeric operator function elements, a second palette window may include signal processing function elements, and a third palette window may include Boolean operator elements, etc.

Palette window selection items in a palette window may be selected to display a lower level palette window in the hierarchy. Thus, palette window selection items are one mechanism for navigating among the hierarchy of palette windows. In one embodiment, a first palette window may include one or more palette window selection items that, when selected, open a second palette window that may be referred to as a child of the first (parent) palette window. When the child palette window is opened, the parent (current) palette window may be automatically closed. Thus, in one embodiment, at most one palette window in a hierarchy is displayed at one time.

Thus, unlike palette items or program elements that may be selected to perform a function, such as being selected to be added to a window, the palette window selection items are selected primarily (or only) for the purpose of displaying lower level palette windows in the hierarchy.

Some palette windows in a hierarchy may comprise only palette window selection items. For example, the "root" or top-level palette window may include only palette window selection items for selecting other palette windows to be displayed. Other palette windows (e.g. the lowest palette windows in the hierarchy) may comprise only palette items and may not include any palette window selection items. Yet other windows may comprise a combination of palette window selection items and palette items. For example, in one embodiment of a graphical programming application, palette windows may include palette window selection items and palette items representing selectable program elements such as user interface elements and/or function elements.

In one embodiment, the palette window selection items may include an indicator to distinguish these selection items from palette items or other items in the palette window. For example, a selection item may include a graphical indicator, such as an arrow, that identifies the item as a palette window selection item that references a lower level palette window.

Palette Window Navigation Items

In one embodiment of the invention, palette windows in a hierarchy may include one or more navigation items for navigating among the hierarchy of palette windows. In one embodiment, the navigation items may be comprised in a navigation toolbar. The navigation toolbar may be displayed at the top of each palette window. In one embodiment, the navigation items may include one or more of a back navigation item, a forward navigation item, and an up navigation item. In one embodiment, the back navigation item may be represented as a back arrow, the forward navigation item may be represented as a forward arrow, and the up navigation item may be represented as an up arrow.

The back navigation item may be operable when selected to open or display a most recently previously displayed palette window in a backward direction. The forward navigation item may be operable when selected to open or display a most recently previously displayed palette window in a forward direction. The up navigation item may be operable when selected to open or display a parent palette window of the current palette window, regardless of the most recently previously displayed palette window. Various other navigation items may be included which perform other types of navigation.

The navigation items may be used in navigating to previously displayed (or nonpreviously displayed) palette windows and other windows in the program. In one embodiment, a navigation item may be used to list and optionally select from the palette windows that are higher in the hierarchy of palette windows than the currently displayed palette window. In another embodiment, a navigation item may be used to list and optionally select from the palette windows that are lower in the hierarchy of palette windows than the currently displayed palette window.

When a palette window is opened or displayed using one of the navigation items, the current palette window is closed or no longer displayed. Thus, in one embodiment, at most one palette window in a hierarchy is displayed at one time. For example, when a previously displayed palette window, or one higher in the hierarchy, is opened using one of the navigation items, the current palette window is closed or no longer displayed.

In one embodiment, when there is no previously displayed palette window from the current palette window, or when there is no palette window higher (or lower) in the hierarchy than the current window, one or more of the navigation items may be disabled.

In one embodiment, a mechanism for searching for palette windows and/or palette window content (e.g. program elements and palette window selection items) may be provided. In one embodiment, a search window may be opened from any palette window in the hierarchy. The search window may provide an interface to allow the user to search for and locate palette windows and/or palette window content in the hierarchy of palette windows. From the search window, the user may directly open located palette windows in the hierarchy. The various navigation items may still operate after a search to return to the previously displayed palette window in which the search originated. In one embodiment, the search window may also include one or more navigation items operable when selected to open or display previously displayed palette windows from the search window.

FIGS. 5A–5E—Navigating Among a Hierarchy of Palette Windows

FIGS. 5A–5E illustrate an exemplary graphical user interface (of a graphical programming environment) used to illustrate various embodiments of a method for navigating among a hierarchy of palette windows using graphical palette window selection items. It is noted, however, that the various aspects of the present invention illustrated in this example may be applied to any computer-executable program or application that uses one or more hierarchies of palette windows.

In the exemplary graphical programming environment, program elements (also called "palette items") may be added to windows (e.g. block diagram or user interface windows of a program currently being created or modified in the exemplary graphical programming application) from the hierarchies of palette windows 200 as illustrated in FIGS. 5A–5E. The program elements may be represented as graphical objects in the palette windows 200.

Figure 5A:
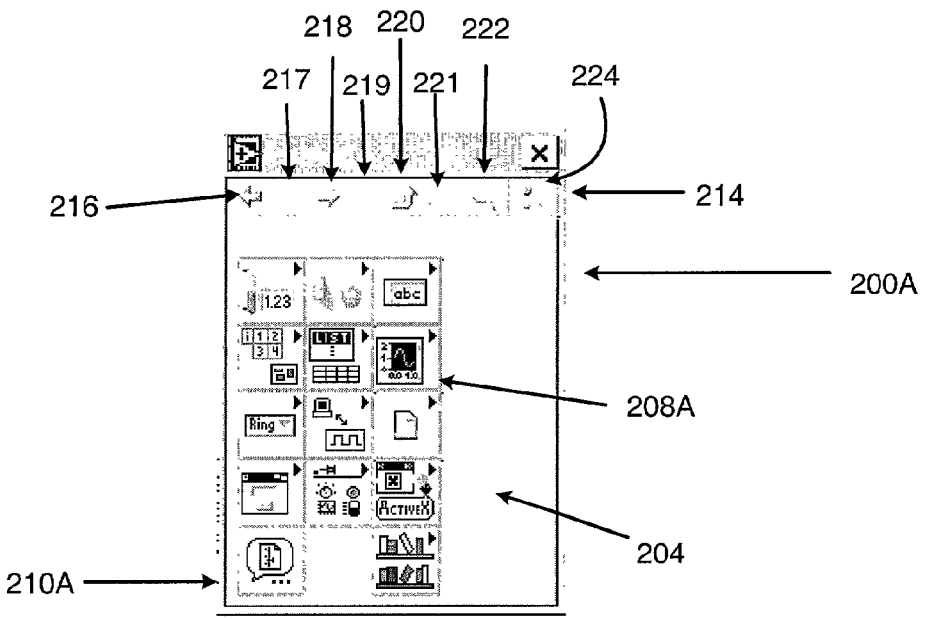
FIGS. 5A–5E illustrate a method for navigating among a hierarchy of palette windows with graphical palette window selection items according to one embodiment.

Palette windows 200 as illustrated in FIGS. 5A–5E may include a palette 204 of one or more graphical items which may include palette window selection items 208 (for example, graph palette window selection item 208A of FIG. 5A), program elements 212 (for example, user interface element 212A of FIG. 5C), and utility items 210 (for example, utility item 210A of FIG. 5A for displaying an interface for selecting custom controls). Each item may include a graphical or textual indication of the type of item it is, and may include graphical and/or textual indications of the palette window, program element, etc. that it represents. In the palette windows 200 illustrated in FIGS. 5A–5E, a triangle or arrow at the upper right corner of an item may indicate that the item is a palette window selection item 208, an ellipsis at the bottom of an item may indicate that the item is a utility item 210, and the absence of an indicator may indicate that the item is a program element 212. Other embodiments may include other types of items. Other embodiments may also use other graphical or textual indicators for identifying item types to users.

Figure 5B:
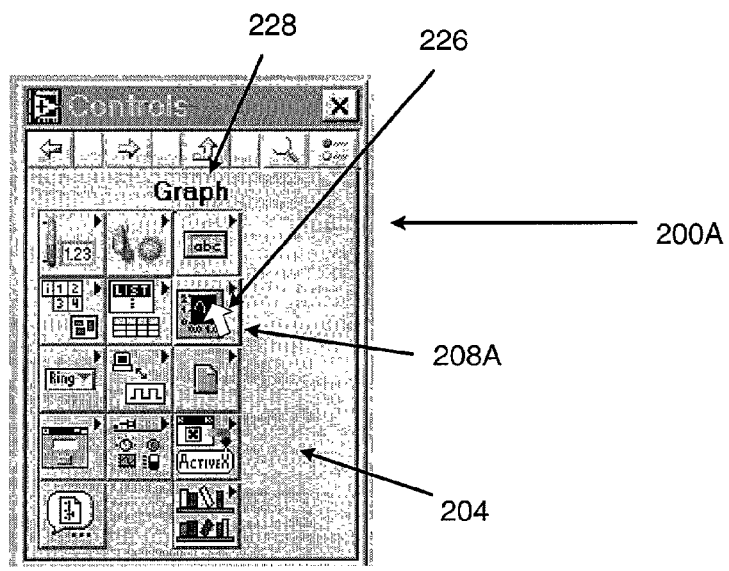
Figure 5C:
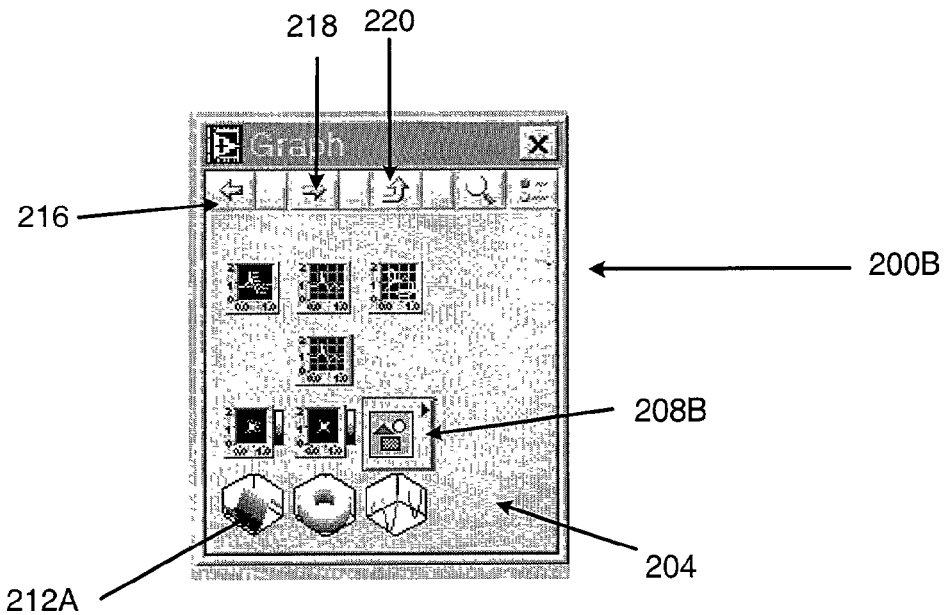

In one embodiment as illustrated in FIG. 5B, when a user selects an item, for example, by moving cursor 226 over the item, a description of the item may be displayed in the palette window. In this example, "Graph" appears above the items in the palette 204 for selected palette window selection item 208A, indicating that a palette window associated with item 208A may include one or more items related to adding graph functionality to a program. Upon selecting palette window selection item 208A of palette window 200A, for example, by clicking or double-clicking the item, a second palette window 200B is displayed as illustrated in FIG. 5C, and palette window 200A is closed. In this example, palette window 200A may be described as a parent of palette window 200B, and palette window 200B as a child of palette window 200A. In this example, items in palette window 200B may be related to adding graph functionality to a program currently being created or modified.

Figure 5D:
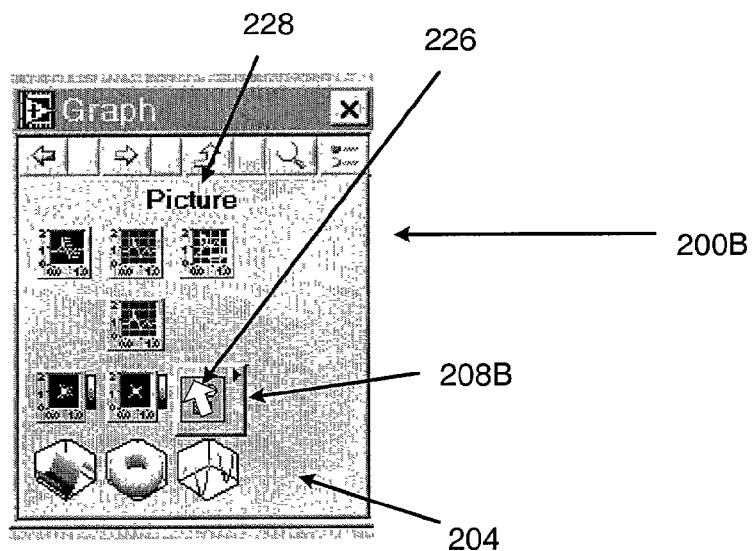
Figure 5E:
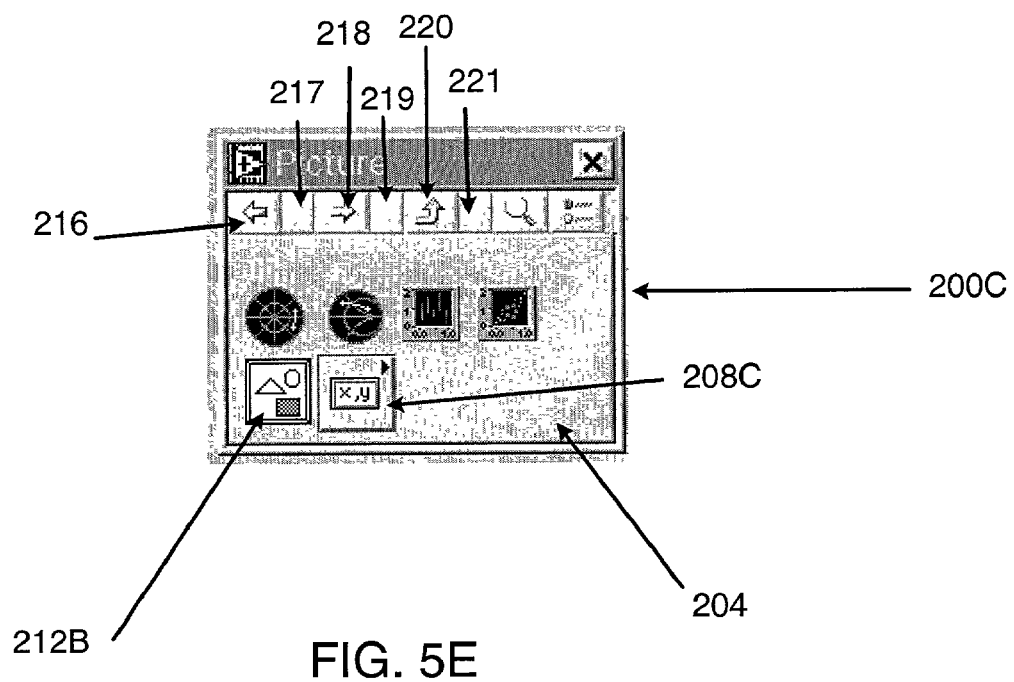

Upon selecting palette window selection item 208B of palette window 200B as illustrated in FIG. 5D, a third palette window 200C is displayed as illustrated in FIG. 5E, and palette window 200B is closed. In this example, palette window 200B may be described as a parent of palette window 200C, and palette window 200C as a child of palette window 200B. In this example, items in palette window 200C may be related to adding picture graphs to a program currently being created or modified. For example, user interface element 212B may be added to a user interface window in a program currently being created or modified, for example, by dragging and dropping the item on the user interface window. Palette window 200C may also include one or more palette window selection items 208, for example, item 208C, which display child palette windows 200 of palette window 200C when selected. By selecting other palette window selection items 208 on one of the palette windows 200 as illustrated in FIGS. 5A–5E, other branches of the hierarchy of palette windows may be displayed.

Note that, unlike prior art palette windows, previously opened palette windows 200 in the hierarchy are not displayed when a child palette window of a current palette window is displayed. Thus, in the present invention, there is no limitation imposed by keeping palette windows open as there is for the palette windows as illustrated in FIGS. 4A–4D. This operates to present more of a web browser type interface.

Palette windows 200 as illustrated in FIGS. 5A–5E may also include one or more navigation items for navigating among the hierarchy of palette windows 200. FIG. 5A illustrates one embodiment of a palette window 200A with several navigation items comprised in a navigation toolbar 214. The navigation items in this embodiment may include one or more of a back navigation item 216, a forward navigation item 218, and an up navigation item 220. In one embodiment, palette windows 200 may also include a back navigation menu item 217, a forward navigation menu item 219, and an up navigation menu item 221.

After using the palette window selection items 208 to display two or more palette windows as described above for FIGS. 5A–5E, the back and forward navigation items 216 and 218 may be used to navigate to previously displayed palette windows in a backward and forward direction. For example, the selection of back navigation item 216 of palette window 200C of FIG. 5E causes palette window 200B of FIG. 5C (the most recently displayed palette window in a backward direction) to be displayed, and palette window 200C to be closed. Subsequently selecting back navigation item 216 of palette window 200B of FIG. 5C causes palette window 200A of FIG. 5A (the next previously displayed palette window in the backward direction) to be displayed and palette window 200B to be closed.

From palette window 200A, forward navigation item 218 may then be selected to display palette window 200B of FIG. 5C (the most recently displayed palette window in the forward direction) and close palette window 200A. Subsequently selecting forward navigation item 218 from palette window 200B of FIG. 5C results in palette window 200C of FIG. 5E (the next palette window in the forward direction) being displayed, and palette window 200B being closed.

After using the palette window selection items 208 to display two or more palette windows as illustrated in FIGS. 5A–5E, the back and forward navigation menu items 217 and 219 may also be used to navigate to previously displayed palette windows in a backward and forward direction. Selecting a navigation menu item may result in the display of a menu including menu items for one or more previously displayed palette windows 200. Selecting a menu item for one of the palette windows 200 from the menu causes the selected palette window 200 to be displayed and the currently displayed palette window 200 to be closed.

For example, the selection of back navigation menu item 217 of palette window 200C of FIG. 5E may display a menu including menu items for all previously displayed palette windows in a backward direction (in this example, palette window 200B of FIG. 5C and palette window 200A of FIG. 5A). Selecting the menu item for palette window 200A from the menu causes palette window 200A to be displayed and palette window 200C to be closed. Subsequently selecting the forward navigation menu item 219 of palette window 200A of FIG. 5A may display a menu including menu items for all previously displayed palette windows in a forward direction (in this example, palette window 200B of FIG. 5C and palette window 200C of FIG. 5E). Selecting the menu item for palette window 200B from the menu causes palette window 200B to be displayed and palette window 200A to be closed.

The up navigation item 220 may be used to navigate to palette windows higher in the hierarchy of palette windows than the currently displayed palette window. For example, the selection of up navigation item 220 of palette window 200C of FIG. 5E causes palette window 200B of FIG. 5C (the parent palette window of palette window 200C) to be displayed, and palette window 200C to be closed. Subsequently selecting up navigation item 220 of palette window 200B of FIG. 5C causes palette window 200A of FIG. 5A (the parent palette window of palette window 200B) to be displayed and palette window 200B to be closed. Note that, in this example, if palette window 200A is the root palette window (i.e. has no parent) then selecting up navigation item 220 of palette window 200A will have no effect.

The up navigation menu item 221 may also be used to navigate to palette windows higher in the hierarchy of palette windows than the currently displayed palette window. For example, the selection of up navigation menu item 221 of palette window 200C of FIG. 5E may display a menu including menu items for all palette windows higher in the hierarchy than palette window 200C (in this example, palette window 200B of FIG. 5C and palette window 200A of FIG. 5A). Selecting the menu item for one of the palette windows 200 from the menu causes the selected palette window 200 to be displayed and palette window 200C to be closed.

Figure 6A:
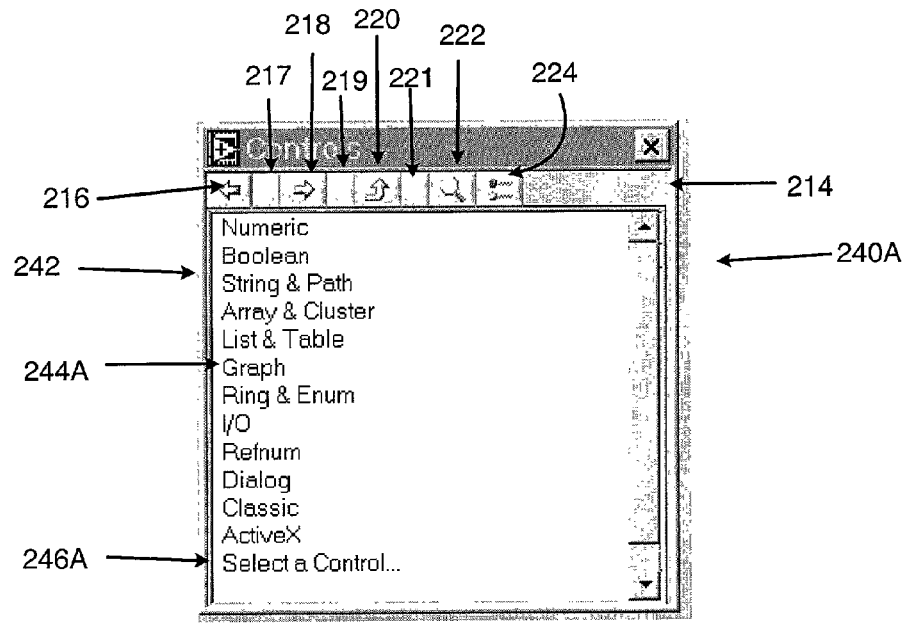
FIGS. 6A–6C illustrate a method for navigating among a hierarchy of palette windows with textual palette window selection items according to one embodiment.

In one embodiment, palette windows 200 may also include a search item 222. In one embodiment, palette windows 200 may also include an item 224 that, when selected, displays a user interface for changing the configuration, display characteristics, etc. of palette windows in the hierarchy. In one embodiment, the user interface may allow the user to toggle the palette window to display items in palette windows in either textual format (as illustrated in FIG. 6A), graphical format (as illustrated in FIG. 5A) or optionally in a combination of graphical and textual. In one embodiment, the user interface may also allow palette window selection items 208 to be added to and/or removed from palette windows 204, thus providing a method for the user to modify the hierarchy of palette windows.

Figure 6B:
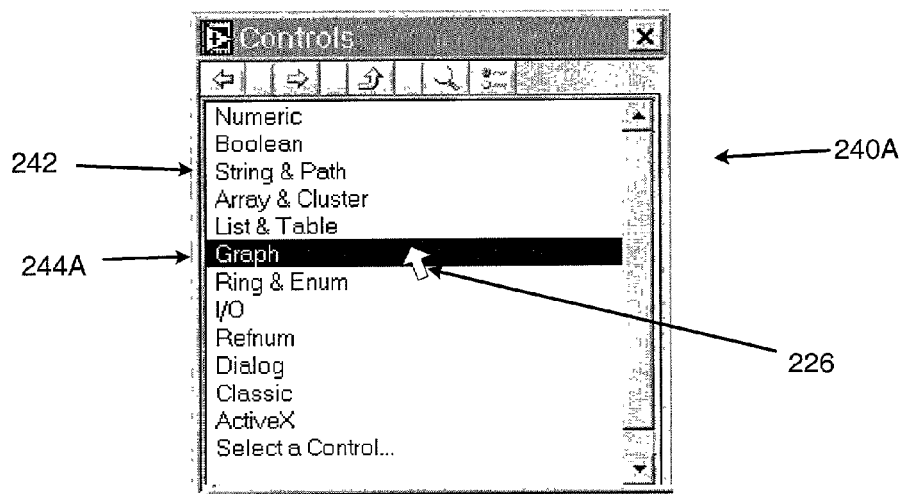
Figure 6C:
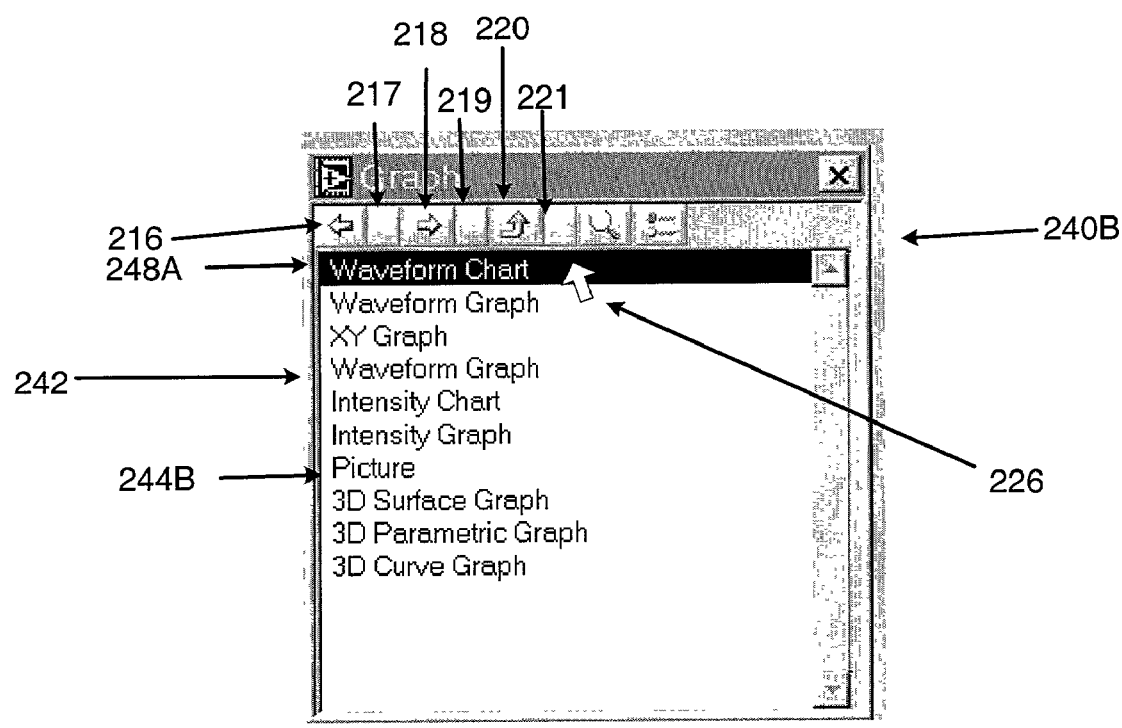

FIGS. 6A–6C—Palette Windows with Text Palette Window Selection Items

FIGS. 6A–6C illustrate an exemplary graphical programming environment used to illustrate various embodiments of a method for navigating among a hierarchy of palette windows using textual palette window selection items. It is noted, however, that the various aspects of the present invention illustrated in this example may be applied to any computer-executable program or application that uses one or more hierarchies of palette windows.

In the exemplary graphical programming environment, program elements may be added to windows (e.g. a functional or user interface windows of a program currently being created or modified) from hierarchy of palette windows 240 with textual palette window selection items as illustrated in FIGS. 6A–6C. The program elements may be represented as text objects in the palette windows 240.

Palette windows 240 as illustrated in FIGS. 6A–6C may include a list 242 of one or more text items including palette window selection text items 244 (for example, graph palette window selection text item 244A of FIG. 6A), program elements 248 (for example, user interface element 248A of FIG. 6C), and utility items 246 (for example, utility item 246A of FIG. 6A).

In one embodiment as illustrated in FIG. 6B, when a user selects a text item from the list 242, for example, by moving cursor 226 over the text item, the text item may be highlighted. In this example, the selected palette window selection text item 244A "Graph" is highlighted. Upon selecting palette window selection text item 244A of palette window 240A, for example, by clicking or double-clicking the item, a second palette window 240B is displayed as illustrated in FIG. 6C, and palette window 240A is closed. In this example, palette window 240A may be described as a parent of palette window 240B, and palette window 240B as a child of palette window 240A.

In this example, items in palette window 240B may be related to adding charts and graphs to a program currently being created or modified. For example, user interface element 248A may be added to a user interface window in a program currently being created or modified, for example, by dragging and dropping the item on the user interface window. Palette window 240B may also include one or more palette window selection text items 244, for example item 244B, which display child palette windows 240 of palette window 24B when selected. By selecting other palette window selection text items 244 on one of the palette windows 240 as illustrated in FIGS. 6A–6C, other branches of the hierarchy of palette windows may be displayed.

Palette windows 240 as illustrated in FIGS. 6A–6C may also include one or more navigation items for navigating among the hierarchy of palette windows 240. FIG. 6A illustrates one embodiment of a palette window 240A with several navigation items comprised in a navigation toolbar 214. The navigation items in this embodiment may include back navigation item 216, forward navigation item 218, and up navigation item 220. In one embodiment, palette windows 240 may also include back navigation menu item 217, forward navigation menu item 219, and up navigation menu item 221.

After using the palette window selection items 208 to display two or more palette windows as described above for FIGS. 6A–6C, the back and forward navigation items 216 and 218 may be used to navigate to previously displayed palette windows in a backward and forward direction. For example, the selection of back navigation item 216 of palette window 240B of FIG. 6C causes palette window 240A of FIG. 6A (the most recently displayed palette window in a backward direction) to be displayed, and palette window 240B to be closed. From palette window 240A, forward navigation item 218 may then be selected to display palette window 240B of FIG. 6C (the most recently displayed palette window in the forward direction) and close palette window 240A.

After using the palette window selection items 208 to display two or more palette windows as illustrated in FIGS. 6A–6C, the back and forward navigation menu items 217 and 219 may also be used to navigate to previously displayed palette windows in a backward and forward direction. Selecting a navigation menu item may result in the display of a menu including menu items for one or more previously displayed palette windows 240. Selecting a menu item for one of the palette windows 240 from the menu causes the selected palette window 240 to be displayed and the currently displayed palette window 240 to be closed.

For example, the selection of back navigation menu item 217 of palette window 240B of FIG. 6C may display a menu including menu items for all previously displayed palette windows in a backward direction (in this example, palette window 240A of FIG. 6A). Selecting the menu item for palette window 240A from the menu causes palette window 240A to be displayed and palette window 240B to be closed. Subsequently selecting the forward navigation menu item 219 of palette window 240A of FIG. 6A may display a menu including menu items for all previously displayed palette windows in a forward direction (in this example, palette window 240B of FIG. 6C). Selecting the menu item for palette window 240B from the menu causes palette window 240B to be displayed and palette window 240A to be closed.

The up navigation item 220 may be used to navigate to palette windows higher in the hierarchy of palette windows than the currently displayed palette window. For example, the selection of up navigation item 220 of palette window 240B of FIG. 6C causes palette window 240A of FIG. 6A (the parent palette window of palette window 240B) to be displayed, and palette window 240B to be closed. Note that, in this example, if palette window 240A is the root palette window (i.e. has no parent) then selecting up navigation item 220 of palette window 240A will have no effect.

The up navigation menu item 221 may also be used to navigate to palette windows higher in the hierarchy of palette windows than the currently displayed palette window. For example, the selection of up navigation menu item 221 of palette window 240B of FIG. 6C may display a menu including menu items for all palette windows higher in the hierarchy than palette window 240B (in this example, palette window 240A of FIG. 6A). Selecting the menu item for palette window 240A from the menu causes the selected palette window 240A to be displayed and palette window 240B to be closed.

In one embodiment, palette windows 240 may also include search item 222. In one embodiment, palette windows 240 may also include an item 224 that, when selected, displays a user interface for changing the configuration, display characteristics, etc. of palette windows in the hierarchy. In one embodiment, the user interface may allow the user to toggle the palette window to display items in the palette windows in either textual format (as illustrated in FIG. 6A) or graphical format (as illustrated in FIG. 5A). In one embodiment, the user interface may also allow palette window selection text items 244 to be added to and/or removed from list 242, thus providing a method for a user to modify the hierarchy of palette windows.

FIGS. 7A–7D—A Search Window for Locating Palette Windows in a Hierarchy

FIGS. 7A–7D illustrate an exemplary graphical user interface (in a graphical programming development environment application) with a search window 300 for locating palette windows and palette window content in a hierarchy of palette windows according to one embodiment. It is noted, however, that the various aspects of the present invention illustrated in this example may be applied to any computer-executable program or application that uses one or more hierarchies of palette windows.

In one embodiment, palette windows such as those illustrated in FIGS. 5A and 6A may include a search item 224 that, when selected, displays search window 300. For example, a user may select search item 244 from palette window 200A of FIG. 5A, resulting in search window 300 of FIG. 7A being displayed. In one embodiment, the palette window from which the search window 300 was selected may be automatically closed when the search window 300 opens.

Figure 7A:
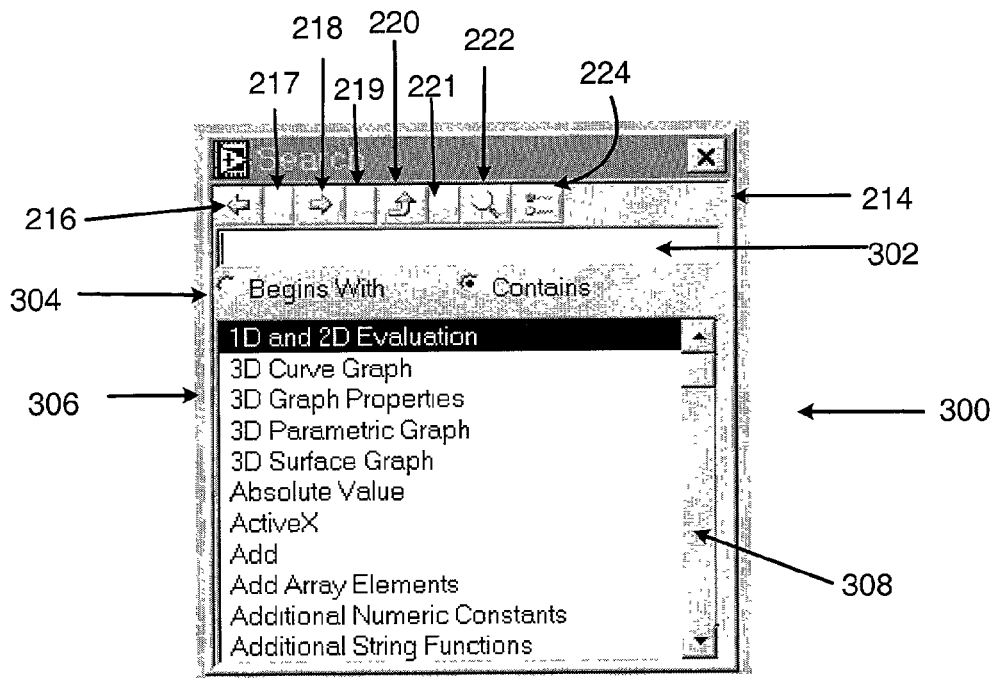
FIGS. 7A–7D illustrate a search window for locating palette windows in a hierarchy of palette windows according to one embodiment.

Search window 300 may also include one or more navigation items for navigating among the hierarchy of palette windows. FIG. 7A illustrates one embodiment of a search window 300 with several navigation items comprised in a navigation toolbar 214. The navigation items in this embodiment may include back navigation item 216, forward navigation item 218, and up navigation item 220. In one embodiment, search window 300 may also include back navigation menu item 217, forward navigation menu item 219, and up navigation menu item 221.

Search window 300 may also include a search field 302 configured to accept user input for searching for palette windows and/or palette window content. Search window 300 may also include a list 306 of text entries or strings that may include palette window titles and program element names. In one embodiment, the text entries in list 306 may be in alphabetical order. Search window 300 may also include a scroll bar 308 for viewing hidden portions of list 306. In one embodiment, if the text entries currently in list 306 are all visible within search window 300, the scroll bar may be hidden or disabled. Search window 300 may also include interface items 304 for modifying aspects of searches for strings in the list of text entries. In this example, two interface items 304 are shown that allow a user to toggle between searching for text entries beginning with a search string and searching for text entries including a search string.

Figure 7B:
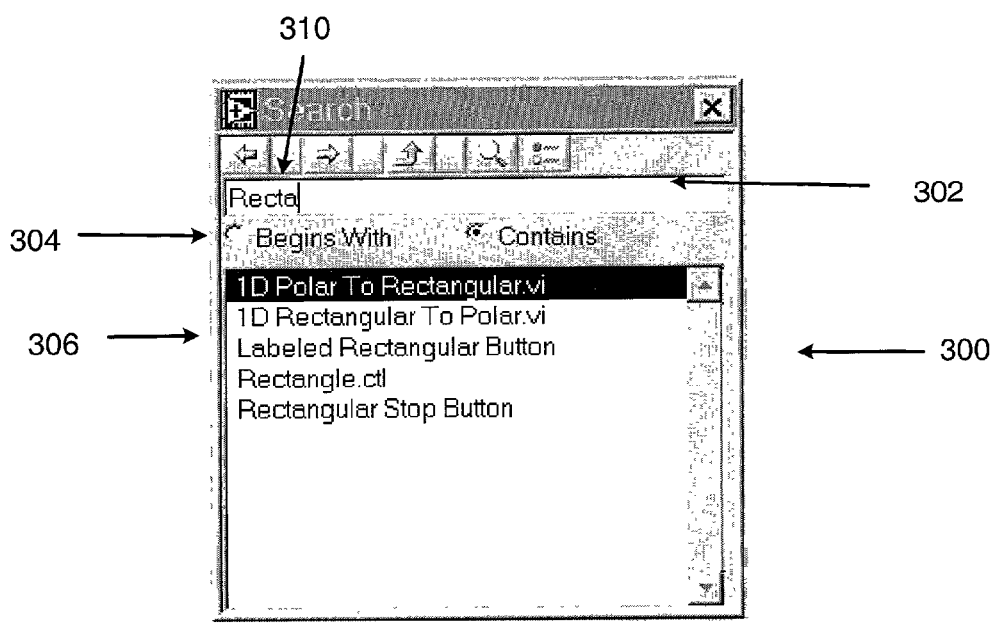
Figure 7C:
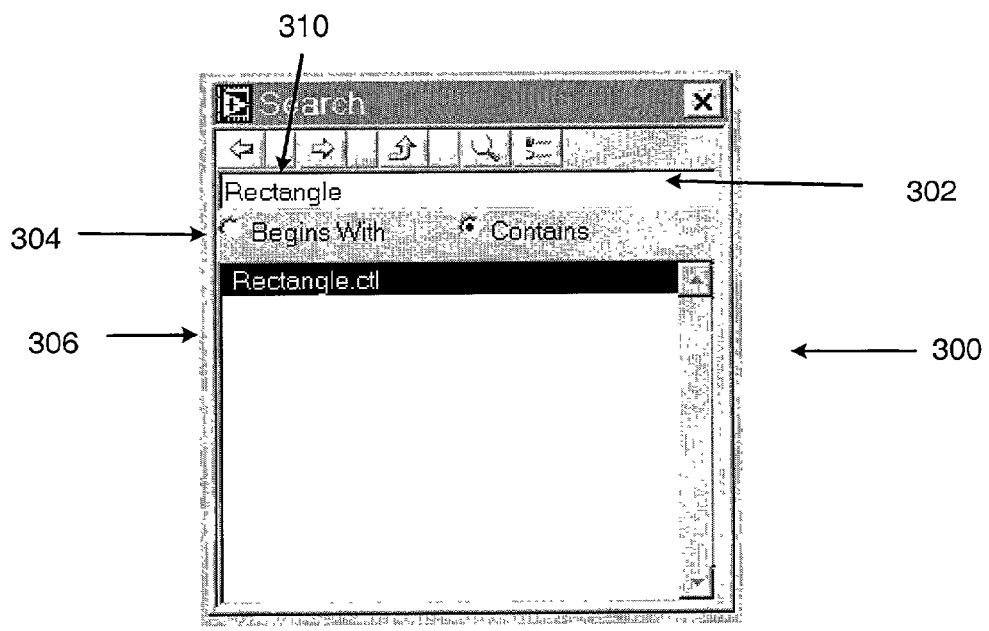
Figure 7D:
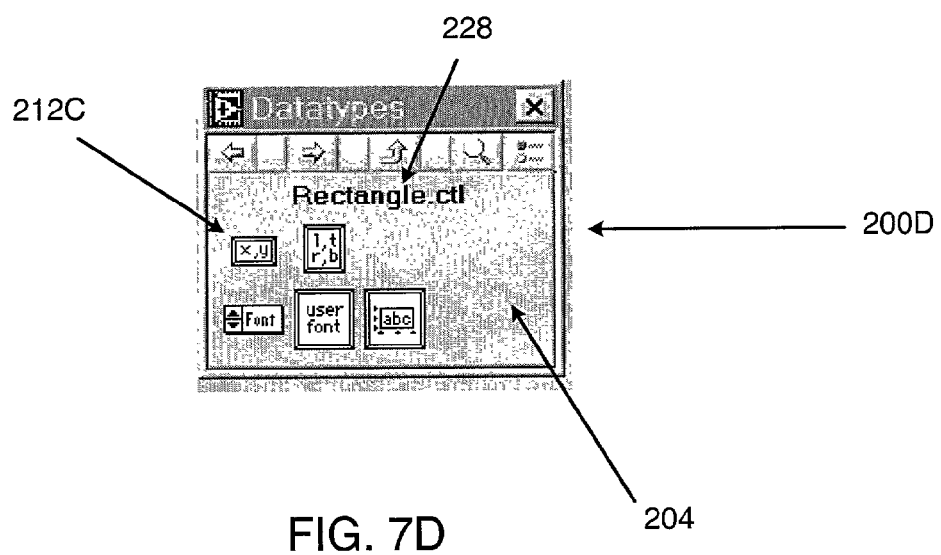

FIGS. 7B–7D illustrate using search window 300 to locate content (e.g. program objects) and/or palette windows. In FIG. 7B, a user may enter a text string in search field 302. In this example, the user may enter the string "Recta" in search field 302, and the list 306 of entries is reduced to entries including the entered string. In FIG. 7C, the user may enter the string "Rectangle" in search field 302, and the list 306 is reduced to the one entry including the entire entered string. Note that if the user enters a string that is not included in any entries in list 306, then the displayed list of entries may be empty.

The user may select a text entry, e.g. by clicking or double-clicking on a text entry in the list 306, to display a palette window associated with the entry. For example, in FIG. 7C, the user may select (e.g. click on) the entry "Rectangle.ctl", and the "Datatypes" palette window 200D illustrated in FIG. 7D may be displayed. Palette window 200D includes the program element "Rectangle.ctl" 212C corresponding with the "Rectangle.ctl" text entry in list 306 of search window 300 selected by the user. In one embodiment, if the palette windows are currently in text display mode, the items in the "Datatypes" palette window are displayed in text format similar to the items in the palette window 240A as illustrated in FIG. 6A.

In one embodiment, the search window 300 may be closed when a palette window is displayed. Alternatively, the user may open a palette window from a list 306 including more than one text entry in search window 300 (for example, search window 300 as shown in FIGS. 7A and 7B) by selecting a text entry associated with the palette window from the list 306, for example, by moving the cursor over the item and clicking or double-clicking it.

In one embodiment, list 306 of search window 300 may include one or more palette items. Palette items displayed in list 306, similar to palette items in palette windows, may be selectable to perform various program functions, e.g., palette items may be selected to display the corresponding icon in a window being constructed, for example, graphical user interface windows and block diagram windows, or may be selected to perform a desired function. In one embodiment, a palette item may be placed on a window by selecting the item in list 306 and "dragging and dropping" the item on the window. Other methods of adding items from list 306 to windows may be used. For example, in one embodiment, a user may select an item in list 306 and a menu choice may then be selected to add the selected item to a window. Thus, the search results displayed in the search window may include palette items (e.g., icons) that can be selected, such as through a drag and drop method, directly from the search window, in a similar manner to which the palette item may be selected from its respective palette window.

Figure 8A:
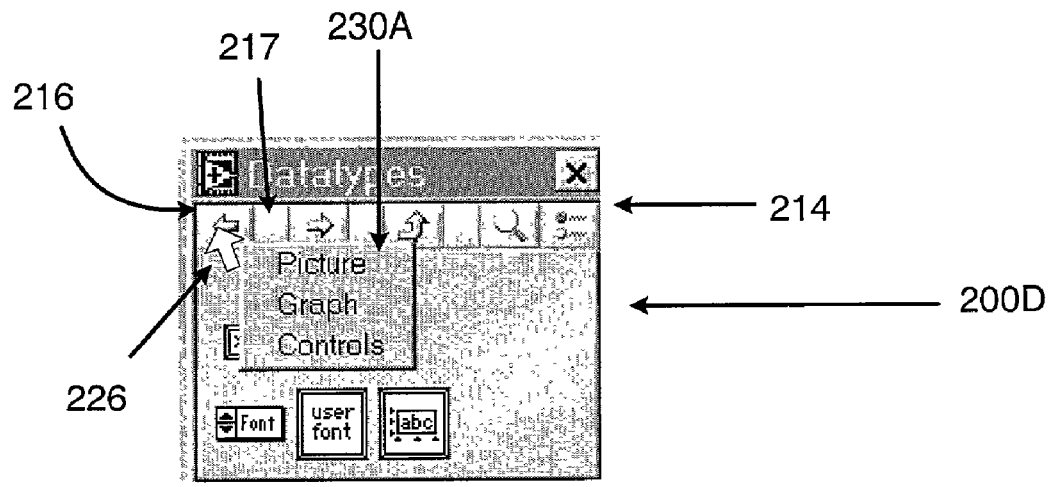
FIGS. 8A and 8B illustrate exemplary palette windows with several navigation items for navigating among a hierarchy of palette windows according to one embodiment.
Figure 8B:
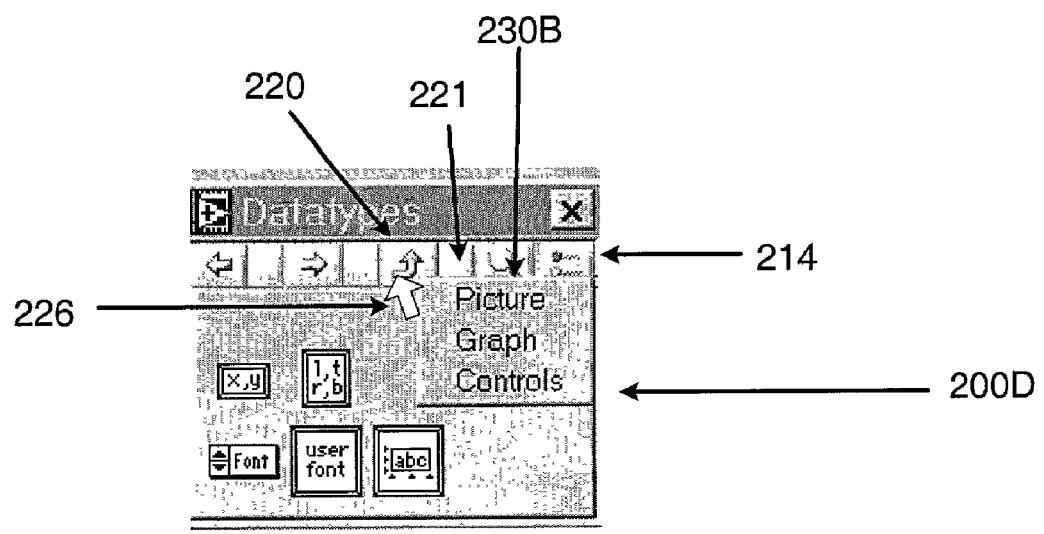

FIGS. 8A and 8B—An Exemplary Palette Window with Navigation Items

FIGS. 8A and 8B illustrate a palette window in an exemplary graphical programming environment with navigation items for navigating among a hierarchy or hierarchies of palette windows according to one embodiment. It is noted, however, that the various aspects of the present invention illustrated in this example may be applied to any computer-executable program or application that uses a hierarchy or hierarchies of palette windows.

Palette windows 200D as illustrated in FIGS. 8A–8B may include one or more navigation items for navigating among the hierarchy of palette windows. The navigation items may be comprised in a navigation toolbar 214. The navigation items in this embodiment may include a back navigation item 216, a forward navigation item 218, and an up navigation item 220. In one embodiment, palette window 200D may also include a back navigation menu item 217, a forward navigation menu item 219, and an up navigation menu item 221.

When navigating among a hierarchy of palette windows as illustrated in FIGS. 5, 6, and 7, a user may generate a history of previously displayed windows. FIG. 8A illustrates using a back navigation item 216 to display a list 230A of, and optionally select from, previously displayed windows. Any of several methods may be used to display the list 230A. In one embodiment, the user may move cursor 226 over item 216 and click-hold (e.g. hold down the mouse button) for a short period until the list 230A is displayed. In one embodiment, the user may select back navigation menu item 217 to display the list 230A, for example, by clicking on it. The user may open one of the palette windows in list 230A by selecting one of the items in list 230A. For example, the user might move the cursor over and click on "Graph" in the list 230A to display the "Graph" palette window 200B as illustrated in FIG. 5C.

In one embodiment, the windows in the list 230A may be shown in order from the most recently to the least recently previously displayed window. In other embodiments, other methods of ordering windows in list 230A may be used. Depending on the sequence of navigation that the user has previously performed, the palette windows in the list may or may not be in a hierarchical, parent-child arrangement, where the immediate parent of the currently displayed palette window is the most recently previously displayed palette window. In the example as illustrated in FIG. 8A, "Picture" is the parent of "Datatypes", "Graph" is the parent of "Picture", and "Controls" is the parent of "Graph". If the user has previously navigated up and/or down other branches of the hierarchy or has used the search window 300 to "jump" to palette windows in other hierarchies or branches, then the palette windows may not be in a purely hierarchical arrangement in list 230A.

In one embodiment, the most recently previously displayed window in a backward direction may be displayed by selecting back navigation item 216 without displaying or selecting from a menu. In one embodiment, single-clicking on back navigation item 216 may select the back navigation item. In this example, selecting back navigation item 216 of palette window 200D may display the "Picture" palette window 200C as illustrated in FIG. 5E.

FIG. 8B illustrates using an up navigation item 220 to display a list 230B of, and optionally select from, palette windows above the currently displayed palette window 200D on this branch of the hierarchy of palette windows, and optionally up to the root (first) palette window in the hierarchy. Any of several methods may be used to display the list 230B. In one embodiment, the user may move cursor 226 over item 220 and click-hold (e.g. hold down the mouse button) for a short period until the list 230B is displayed. In one embodiment, the user may select up navigation menu item 221 to display the list 230B, for example, by clicking on it. The user may open one of the palette windows by selecting one of the items in list 230B. For example, the user might move the cursor over and click on "Controls" in the list 230B to display the "Controls" palette window 200A as illustrated in FIG. 5A. The "Controls" palette window may be considered the root palette window in this hierarchy. Note that there may be other hierarchies reachable through the search window or by opening other windows in the graphical programming application that display palette windows in the other hierarchies when opened.

In one embodiment, the palette windows in the list 230B may be shown in order from the immediate parent palette window of the currently displayed palette window to the root palette window of this hierarchy. In other embodiments, other methods of ordering palette windows in list 230B may be used. In the example as illustrated in FIG. 8B, "Picture" is the parent of "Datatypes", "Graph" is the parent of "Picture", and "Controls" is the parent of "Graph".

In one embodiment, the parent palette window of the currently displayed palette window may be displayed by selecting up navigation item 220 without displaying or selecting from a menu. In one embodiment, single-clicking on up navigation item 220 may select the up navigation item. In this example, selecting up navigation item 220 of palette window 200D may display the "Picture" palette window 200C as illustrated in FIG. 5E, which is the parent palette window of palette window 200D.

Figure 9A:
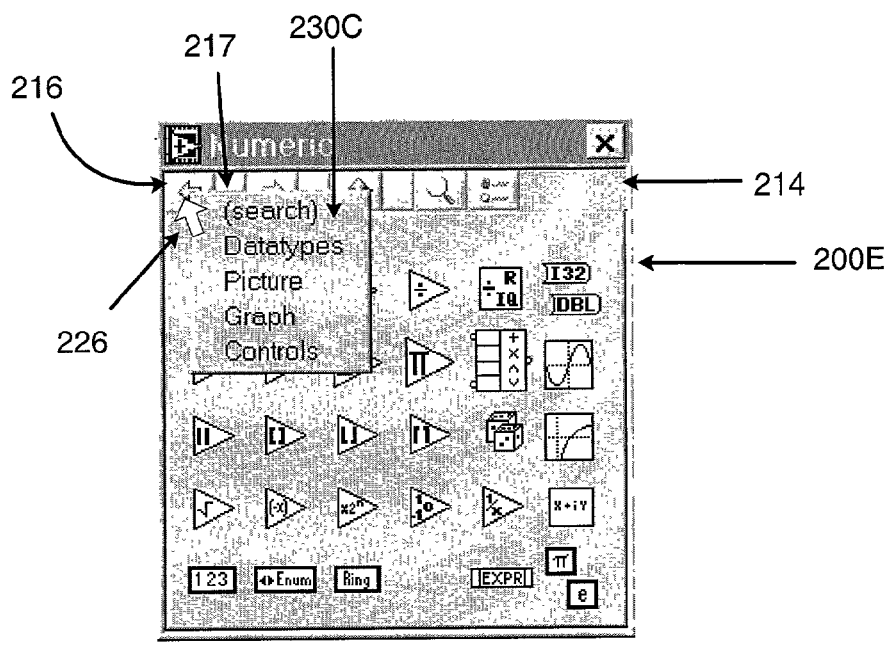
FIGS. 9A–9C further illustrate exemplary palette windows with several navigation items for navigating among a hierarchy of palette windows according to one embodiment.
Figure 9B:
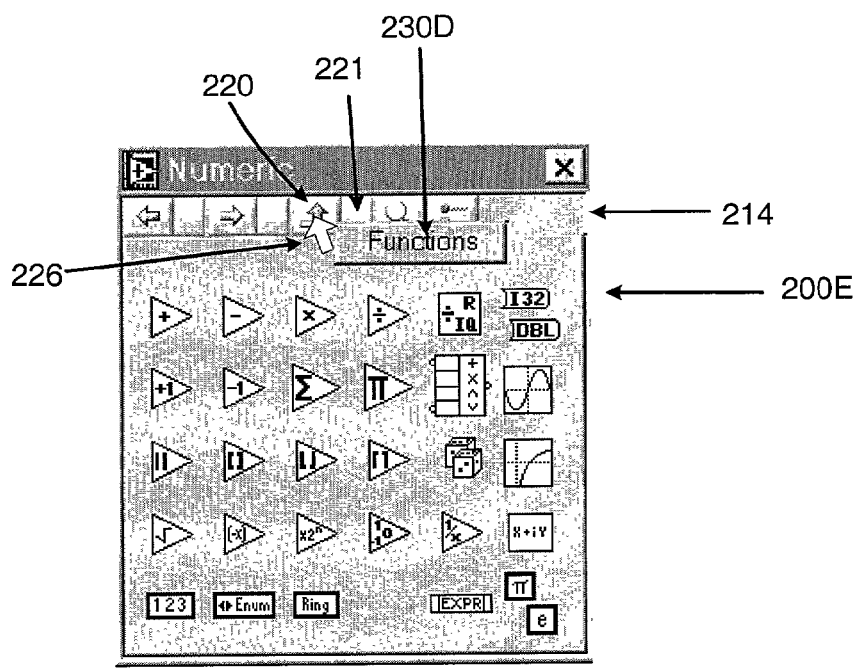
Figure 9C:
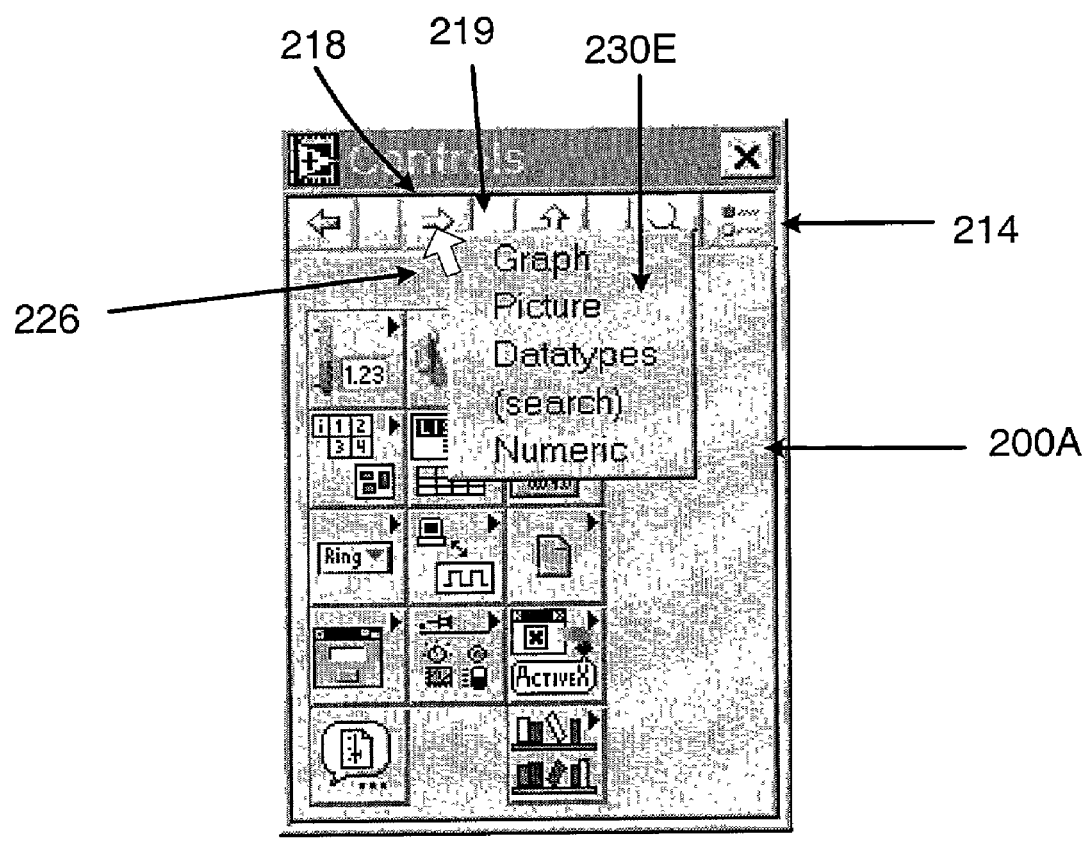

FIGS. 9A–9C—A Second Exemplary Palette Window with Navigation Items

FIGS. 9A–9C illustrate a second palette window 200E in an exemplary graphical programming environment with several navigation items for navigating among a hierarchy of palette windows according to one embodiment to highlight other aspects of using the navigation items. It is noted, however, that the various aspects of the present invention illustrated in this example may be applied to any computer-executable program or application that uses a hierarchy or hierarchies of palette windows.

Palette window 200E as illustrated in FIGS. 9A–9C may include one or more navigation items for navigating among the hierarchy of palette windows, as well as for opening previously displayed windows in the program. The navigation items may be comprised in a navigation toolbar 214. The navigation items in this embodiment may include a back navigation item 216, a forward navigation item 218, and an up navigation item 220. In one embodiment, palette window 200E may also include a back navigation menu item 217, a forward navigation menu item 219, and an up navigation menu item 221.

When navigating among a hierarchy of palette windows as illustrated in FIGS. 5, 6, and 7, a user may generate a history of previously displayed windows. FIG. 9A illustrates using a back navigation item 216 to display a list 230C of, and optionally select from, previously displayed palette windows and/or other windows. Any of several methods may be used to display the list 230C. In one embodiment, the user may select back navigation menu item 217 to display the list 230C, for example, by clicking on it. The user may then open a previously displayed window by selecting one of the items in list 230C. For example, the user might move the cursor over and click on "(search)" in the list 230C to display the search window 300 as illustrated in FIG. 7A. As another example, the user might select "Datatypes" from list 230C to open the Datatypes palette window as illustrated in FIG. 8A.

In one embodiment, the most recently previously displayed window in a backward direction may be displayed by selecting back navigation item 216 without displaying or selecting from a menu. In one embodiment, single-clicking on back navigation item 216 may select the back navigation item and thus display the most recently previously displayed window. In this example, selecting back navigation item 216 of palette window 200E may display the "Search" window 300 as illustrated in FIG. 7A.

FIG. 9B illustrates using an up navigation item 220 to display a list 230D of, and optionally select from, palette windows above the currently displayed palette window 200E on this branch of the hierarchy of palette windows, and optionally up to the root (first) palette window in the hierarchy. Any of several methods may be used to display the list 230D. In one embodiment, the user may select up navigation menu item 221 to display the list 230D, for example, by clicking on it. The user may display a palette window higher in the hierarchy than the current palette window by selecting one of the items in list 230D. For example, the user might move the cursor over and click on "Functions" in the list 230D to display the "Functions" palette window. In this example, the "Functions" palette window may be the root palette window in a hierarchy of palette windows for adding function elements to graphical programs.

In one embodiment, the palette windows in the list 230D may be shown in order from the immediate parent palette window of the currently displayed palette window to the root palette window of this hierarchy. In other embodiments, other methods of ordering palette windows in list 230D may be used. In the example as illustrated in FIG. 9B, "Functions" is the parent palette window of "Numeric".

In one embodiment, the parent palette window of the currently displayed palette window may be displayed by selecting up navigation item 220 without displaying or selecting from a menu. In one embodiment, single-clicking on up navigation item 220 may select the up navigation item.

In this example, selecting up navigation item 220 of palette window 200E may display the "Functions" palette window, which is the parent palette window of palette window 200E.

FIG. 9C illustrates using a forward navigation item 218 of palette window 200A to display a list 230E of, and optionally select from, previously displayed palette windows in a forward direction. In this example, list 230E may have been generated using the back navigation item 216 of palette window 200E to back up through all previously displayed windows in list 230C of FIG. 9A. In this case, selecting forward navigation item 218 of palette window 200A may display the "Graph" window 200B as illustrated in FIG. 5C, which would be the most recently displayed window in a forward direction.

Any of several methods may be used to display the list 230E. In one embodiment, the user may move cursor 226 over item 218 and click-hold (e.g. hold down the mouse button) for a short period until the list 230E is displayed. In one embodiment, the user may select forward navigation menu item 219 to display the list 230E, for example, by clicking on it. The user may open one of the palette windows by selecting one of the items in list 230E. For example, the user might move the cursor over and click on "Numeric" in the list 230E to display the "Numeric" palette window 200E as illustrated in FIG. 9A.

In one embodiment, the palette windows in the list 230E may be shown in order from the most recently to the least recently displayed palette window. In other embodiments, other methods of ordering palette windows in list 230E may be used. Depending on the sequence of navigation that the user has previously performed, the palette windows in the list may or may not be in a hierarchical, parent-child arrangement, where the immediate parent of the currently displayed palette window is the most recently previously displayed palette window. If the user has previously navigated up and/or down other branches of the hierarchy or has used the search window 300 to "jump" to palette windows in other hierarchies or branches, then the palette windows may not be in a purely hierarchical arrangement in list 230E.

In one embodiment, the most recently previously displayed window in a forward direction may be displayed by selecting forward navigation item 218 without displaying or selecting from a menu. In one embodiment, single-clicking on forward navigation item 218 may select the forward navigation item and thus display the most recently previously displayed window in a forward direction.

Figure 10:
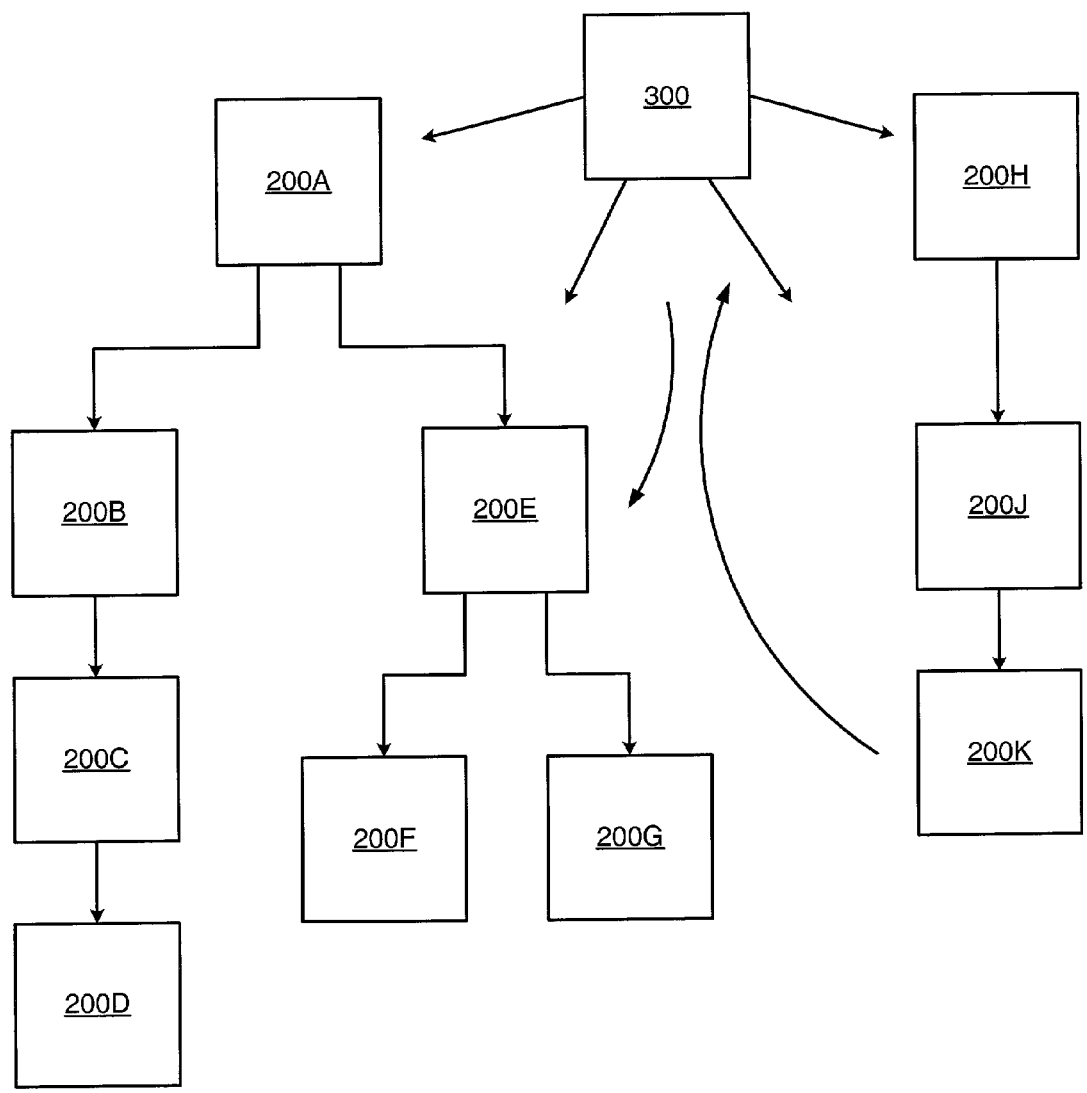
FIG. 10 illustrates a hierarchical organization of several palette windows according to one embodiment.

FIG. 10—A Hierarchical Organization of Palette Windows

FIG. 10 shows an exemplary hierarchical organization of palette windows according to one embodiment. This example shows two hierarchies of palette windows in a graphical programming environment. It is noted, however, that the various aspects of the present invention illustrated in this example may be applied to any computer-executable program or application that uses one or more hierarchies of palette windows.

The root of the first hierarchy is palette window 200A of FIG. 5A. The first hierarchy may include several palette windows for adding user interface elements to programs. The root of the firs hierarchy is palette window 200H. The second hierarchy may include several palette windows for adding function elements to programs.

Each palette window in the hierarchy may have zero or more child palette windows. For example, palette windows 200B and 200E are children of palette window 200A, palette window 200J is a child of palette window 200H, and palette window 200D (among others) has no children. In one embodiment, a palette window may have at most one parent palette window. In another embodiment, a palette window may have more than one parent palette window.

Search window 300 may be accessed from palette windows in either the first or second hierarchy. From there, the user may navigate directly to any palette window in either hierarchy.

The following examples using the exemplary hierarchies of FIG. 10 may be useful in distinguishing between the functionality of the back navigation item 216, the forward navigation item 218, and the up navigation item 220 as illustrated in FIGS. 9A–9C. A user may begin at root palette window 200A. Initially, all lists of palette windows displayed by navigation items may be empty. The user may open palette window 200B, then palette window 200C. At this point, the list of palette windows displayed by back navigation item 216 includes palette windows 200A and 200B, the list of palette windows displayed by forward navigation item 218 is empty, and the list of palette windows displayed by up navigation item 218 includes palette windows 200A and 200B. The user may use the back navigation item to back up to palette window 200B. At this point, the list of palette windows displayed by back navigation item 216 includes palette window 200A, the list of palette windows displayed by forward navigation item 218 includes palette window 200C, and the list of palette windows displayed by up navigation item 218 includes palette window 200A. The user may then use the back navigation item to back up to palette window 200A. At this point, the list of palette windows displayed by back navigation item 216 is empty, the list of palette windows displayed by forward navigation item 218 includes palette windows 200A and 200B, and the list of palette windows displayed by up navigation item 218 is empty, as this is the root of the first hierarchy.

In one embodiment, if a user navigates up and down several branches, then the lists of palette windows displayed by navigation items may include palette windows from the different branches. For example, if the user next opened palette window 200E from palette window 200A, and then opened palette window 200F from palette window 200E, then the list of palette windows displayed by back navigation item 216 may include palette windows 200E, 200A, 200B, and 200C. If the user then used the back navigation item 216 to return to palette window 200C, then the list of palette windows displayed by forward navigation item 218 may include palette windows 200B, 200A, 200E, and 200F.

Multiple Navigation Mode Embodiment

Figure 4A:
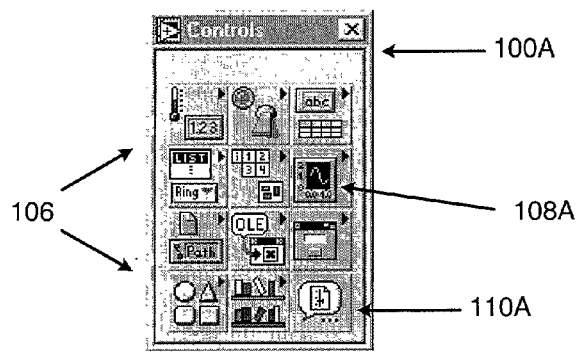
FIGS. 4A–4C illustrate a prior art method for navigating among palette windows.
Figure 4B:
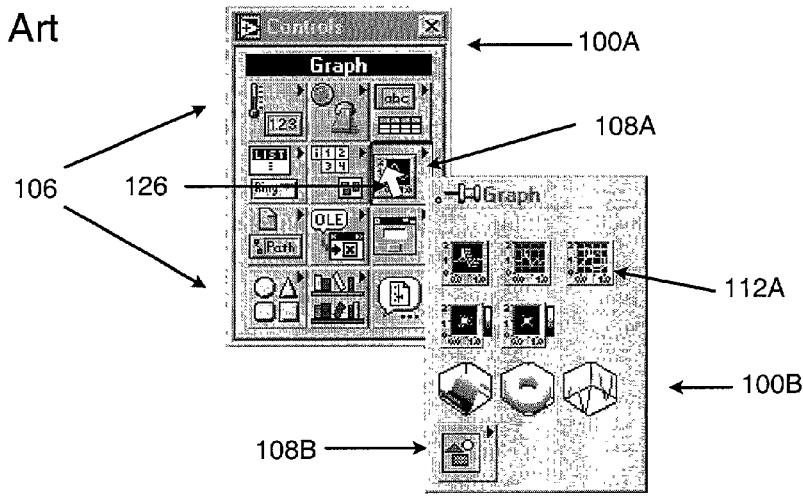
Figure 4C:
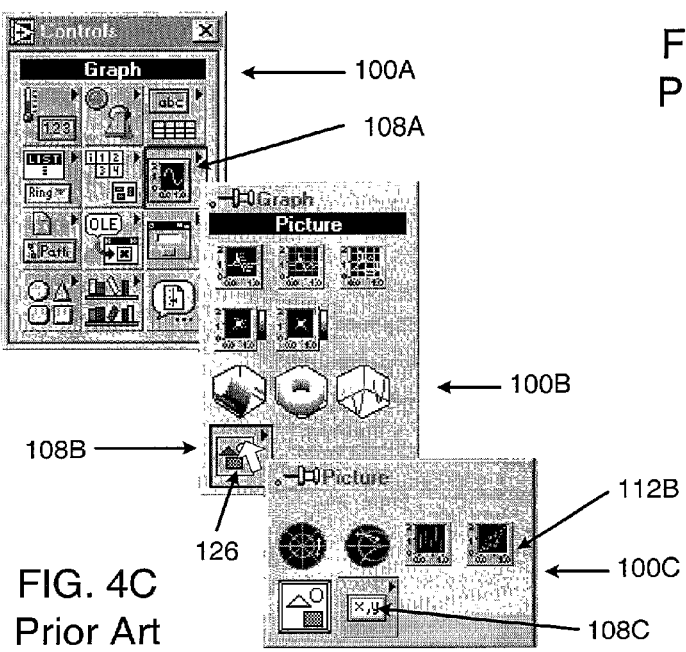

In one embodiment of the invention, the hierarchy of palette windows may have a plurality of different navigation modes, including the browser-based navigation mode described above with respect to FIGS. 5A–10 as well as the prior art "cascading" navigation mode described with respect to FIGS. 4A–4C. For example, in one embodiment the user may "left click" on a palette window selection item in the palette to perform a browser based method as described above with respect to FIGS. 5A–10, and may "right click" on a palette window selection item in the palette to perform a cascading type navigation as shown in FIGS. 4A–4C. This allows the user the choice of selecting which type of palette navigation method the user prefers. The user may also reprogram the left and right mouse buttons of his/her mouse to configure the preferred method for the left or right mouse button, per the user's preference.

Figure 11:
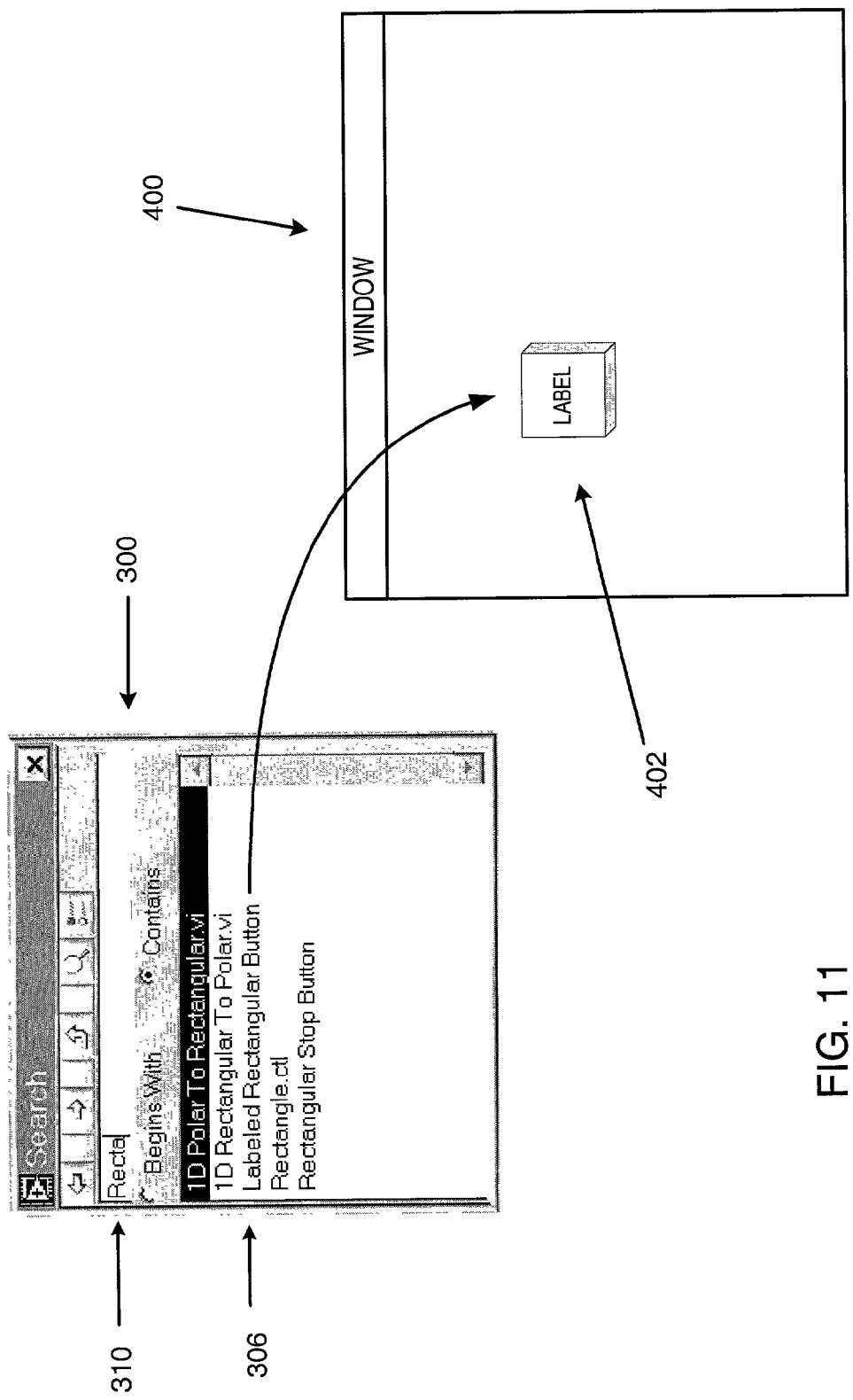
FIG. 11 illustrates incorporating a located program element from a search window into a window of a program being edited according to one embodiment.

FIG. 11—Incorporating Program Elements from a Search Window

FIG. 11 illustrates an example of incorporating a located program element from a search window into a window of a program being edited according to one embodiment. In this example, a user may search for program elements including the search string "Recta" as entered in search field 302 of search window 300 as previously described for FIGS. 7A–7B. A list 306 of text entries or strings that may include palette window titles and program element names may be displayed in the search window 300. The user may select one or more program elements from the list to be incorporated into one or more windows 400 of a program currently being edited, for example, graphical user interface windows and block diagram windows. In this example, the user has selected the item "Labeled Rectangular Button" from the list and has incorporated a button of this type into a user interface window 400 of a program currently being edited.

In one embodiment, a program element may be incorporated into the program by selecting the item in list 306 and "dragging and dropping" the item on a window of the program. Other methods of incorporating items from list 306 into programs may be used. For example, in one embodiment, a user may select an item in list 306 and a menu choice may then be selected to add the selected item to a window of the program.

Figure 12:
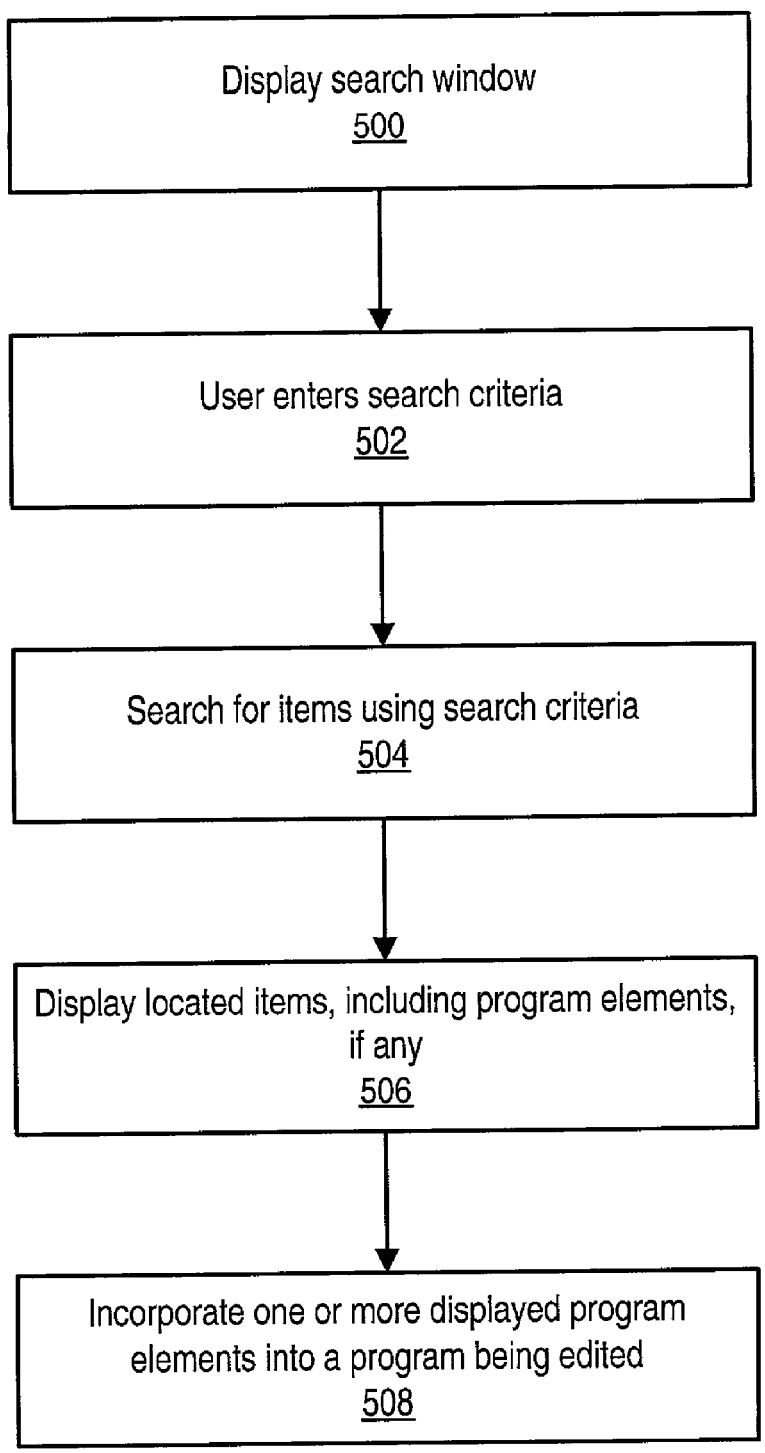
FIG. 12 is a flowchart of a method of searching for, locating and incorporating program elements according to one embodiment.

FIG. 12 Searching for, Locating and Incorporating Program Elements

FIG. 12 is a flowchart of a method of searching for, locating and incorporating program elements according to one embodiment. As indicated at 500, a search window 300 may be displayed on a computer display on which a program is being edited in a graphical programming system. In one embodiment, a user of the system may enter user input to cause the search window to be displayed. For example, a palette window may include a search item that the user may select to cause the search window to be displayed. The user may then enter search criteria into the search window as indicated at 502. The system may then search for items indicated by the search criteria as indicated at 504. At 506, located items may be displayed. These located items may include one or more items related to program elements that may be incorporated in the program being edited to add functionality to the program. In one embodiment, the items may be displayed in the search window, for example, in a list of located elements as illustrated in FIG. 11. Optionally, the located items may be displayed in a different window.

The user may then select one or more located program elements and incorporate the one or more program elements in one or more windows of the program being edited as indicated at 508. In one embodiment, a program element may be incorporated into the program by selecting the item in list 306 and "dragging and dropping" the item on a window of the program. Other methods of incorporating items from list 306 into programs may be used. For example, in one embodiment, a user may select an item in list 306 and a menu choice may then be selected to add the selected item to a window of the program. Thus, the search results displayed in the search window may include program elements that can be selected and incorporated, such as through a drag and drop method, directly from the search window into a window of the program being edited, in a similar manner to which a palette item (representing a program element) may be selected from its respective palette window and incorporated in a window of the program being edited.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or nonvolatile media such as RAM (e.g. SDRAM, RDRAM, SRAM, etc.), ROM, etc. as well as transmission media or signals such as electrical, electromagnetic, or digital signals, conveyed via a communication medium such as network and/or a wireless link.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer-implemented method for adding program elements to programs, the method comprising:
    displaying a program currently being edited in a first graphical user interface displayed on a computer system, wherein the computer system comprises a display;
    displaying a search window on the display;
    receiving user input to the search window specifying one or more search criteria;
    identifying and displaying information indicating a plurality of possible program elements in the search window in accordance with the one or more search criteria;
    receiving user input to the search window selecting a program element from the plurality of possible program elements indicated in the search window; and
    including the selected program element in the program in response to said receiving user input to the search window selecting the program element;
        wherein the first graphical user interface comprises a hierarchy of palette windows, wherein one or more of the palette windows in the hierarchy comprise at least one palette item that represents one of the plurality of possible program elements; and
    wherein the search window includes one or more navigation items for navigating among the hierarchy of palette windows, wherein the navigation items include one or more of a forward navigation item, a backward navigation item, and an up navigation item.

2. The method of claim 1, wherein the plurality of possible program elements are selectable by the user from the search window to add functionality to the program.

3. The method of claim 1,
    wherein the program includes a graphical user interface, wherein the graphical user interface of the program is different from the first graphical user interface, wherein during execution of the program, one or more elements of the graphical user interface of the program are operable to receive and/or output information;
    wherein the plurality of possible program elements includes graphical user interface elements which are each selectable by the user to add a particular graphical user interface function associated with a particular graphical user interface element of the one or more elements of the graphical user interface of the program.

4. The method of claim 1, wherein the plurality of possible program elements includes function elements each selectable by the user to add a particular computer-executable function.

5. The method of claim 1, wherein said including the selected program element in the program comprises receiving user input to drag-and-drop the selected program element to the program.

6. The method of claim 1, wherein the user input in the search window specifying the one or more search criteria includes a search string, and wherein said identifying and displaying information indicating the plurality of possible program elements in the search window in accordance with the one or more search criteria comprises:
    searching for the search string in a plurality of text items comprising text items related to the plurality of possible program elements; and
    displaying one or more text items located by said searching for the search string, wherein each of the one or more located text items includes the search string, and wherein each of the one or more located text items references one of the plurality of possible program elements.

7. The method of claim 6, wherein the user input selecting the program element from the plurality of possible program elements specifies one of the one or more located text items, wherein the specified located text item references the selected program element.

8. A computer-implemented method for adding program elements to a program, the method comprising:
    displaying on a display of a computer system an edit window of a graphical user interface, wherein the edit window comprises the program;
    displaying on the display of the computer system a first palette window from a hierarchy of palette windows, wherein one or more of the palette windows in the hierarchy comprise palette items that are selectable by a user to add functionality to the program, and wherein the first palette window comprises a search item;
    receiving user input selecting the search item of the first palette window;
    displaying a search window on the display of the computer system in response to said user input selecting the search item;
    receiving user input in the search window specifying one or more search criteria;
    identifying and displaying information indicating a plurality of possible palette items in the search window in accordance with the one or more search criteria;
    receiving user input to the search window selecting a palette item from the plurality of possible palette items indicated in the search window; and
    including the selected palette item in the program in response to said receiving user input to the search window selecting the palette item.

9. The method of claim 8, wherein the palette items include icons that are selectable by the user to incorporate graphical user interface elements in a graphical user interface of the program.

10. The method of claim 8, wherein the program currently being edited is a graphical program which comprises a plurality of interconnected nodes that visually indicate functionality of the graphical program, and wherein the palette items include icons that are selectable by the user to include function nodes in the graphical program.

11. The method of claim 8, wherein said including the selected palette item in the edit window comprises receiving user input to drag-and-drop the selected palette item to the edit window.

12. The method of claim 8, wherein the user input in the search window specifying the one or more search criteria includes a search string, and wherein said identifying and displaying information indicating the plurality of possible palette items in the search window comprises:

searching for the search string in a plurality of text items comprising text items related to the plurality of possible palette items; and displaying one or more text items located by said searching in the search window, wherein each of the one or more located text items includes the search string, and wherein each of the one or more located text items references one of the plurality of possible palette items.

13. The method of claim 12, wherein the user input selecting the palette item from the plurality of possible palette items specifies one of the one or more located text items in the search window, wherein the specified located text item references the selected palette item.

14. The method of claim 8, wherein the plurality of possible palette items includes palette items from the one or more palette windows in the hierarchy comprising palette items.

15. The method of claim 8, wherein the plurality of possible palette items includes palette items from a plurality of hierarchies of palette windows.

16. The method of claim 8, wherein the search window includes one or more navigation items for navigating among the hierarchy of palette windows, wherein the navigation items include one or more of a forward navigation item, a backward navigation item, and an up navigation item.

17. A computer-implemented method for searching a hierarchy of palette windows, the method comprising:
  displaying a graphical user interface on a display of a computer system;
  displaying in the graphical user interface a first palette window from a hierarchy of palette windows, wherein one or more of the palette windows in the hierarchy comprise palette items that are selectable by a user to include functionality in a program currently being edited in the graphical user interface;
  receiving user input selecting a search item of the first palette window;
  displaying in the graphical user interface a search window in response to said user input selecting the search item;
  receiving user input in the search window specifying one or more search criteria;
  identifying and displaying information indicating a plurality of possible palette windows in the search window in accordance with the one or more search criteria;
  receiving user input selecting a second palette window from the plurality of possible palette windows; and
  displaying in the graphical user interface the second palette window in response to said user input selecting the second palette window.

18. The method of claim 17, wherein said user input in the search window specifying the one or more search criteria includes a search string, and wherein said identifying and displaying information regarding the plurality of possible palette windows in the search window in accordance with the one or more search criteria comprises:
  searching for the search string in a plurality of text items related to the palette windows in the hierarchy; and
  displaying one or more located text items in the search window, wherein each of the one or more located text items includes the search string, and wherein each of the one or more located text items references one of the plurality of possible palette windows.

19. The method of claim 18, wherein the user input selecting the new palette window from the plurality of possible palette windows specifies one of the one or more located text items in the search window, wherein the specified located text item references the new palette window.

20. The method of claim 17, wherein the plurality of possible palette windows includes palette windows from a plurality of hierarchies of palette windows.

21. The method of claim 17, wherein the search window includes one or more navigation items for navigating among the hierarchy of palette windows, and wherein the method further comprises:
  prior to said displaying in the graphical user interface the search window in response to said user input selecting the search item:
    receiving user input selecting a navigation item displayed on the search window; and
    displaying in the graphical user interface a previously displayed palette window in the hierarchy of palette windows in response to said user input selecting the navigation item.

22. The method of claim 21, wherein the navigation item is one of a forward navigation item, a back navigation item, and an up navigation item.

23. The method of claim 21, wherein the navigation item is a back navigation item operable when selected to display a most recently previously displayed palette window in a backward direction.

24. The method of claim 21, wherein the navigation item is a forward navigation item operable when selected to display a most recently previously displayed palette window in a forward direction.

25. The method of claim 21, wherein the navigation item is an up navigation item operable when selected to display a parent palette window of the first palette window, regardless of the most recently previously displayed palette window.

26. The method of claim 17, wherein the palette items include icons that are selectable by the user to incorporate graphical user interface elements and function nodes in a graphical user interface of the program.

27. The method of claim 17, wherein the program is a graphical program which comprises a plurality of interconnected nodes that visually indicate functionality of the graphical program, and wherein the palette items include icons that are selectable by the user to add functionality to the graphical program.

28. The method of claim 17, wherein the information regarding the plurality of possible palette windows displayed in the search window includes information regarding one or more possible program elements, wherein the information regarding the one or more possible program elements is selectable by the user from the search window to add functionality to the program.

29. A system comprising:
  a processor;
  a memory which stores program instructions, wherein the memory is coupled to the processor;
  an input device configured to receive user input, wherein the input device is coupled to the processor; and
  a display device, wherein the display device is coupled to the processor;
  wherein the program instructions are executable by the processor to:
    display on the display a program currently being edited in a graphical user interface;
    display a search window on the display;
    receive user input to the search window specifying a one or more search criteria;
    identify and display information indicating a plurality of possible program elements in the search window in accordance with the one or more search criteria;

receive user input to the search window selecting a program element from the plurality of possible program elements indicated in the search window; and include the selected program element in the program in response to the user input to the search window selecting the program element;

wherein the program instructions are further executable by the processor to:

display one or more palette windows of a hierarchy of palette windows;

wherein the one or more palette windows in the hierarchy each comprises one or more palette items that represent one of the plurality of possible program elements; and wherein the search window includes one or more navigation items for navigating among the hierarchy of palette windows, and wherein the navigation items include one or more of a forward navigation item, a backward navigation item, and an up navigation item.

30. The system of claim 29, wherein the program comprises a graphical user interface;

wherein the plurality of possible program elements are selectable by the user from the search window to add functionality to the graphical user interface of the program.

31. The system of claim 32, wherein the program includes a graphical user interface, wherein during execution of the program, one or more elements of the graphical user interface of the program are operable to receive and/or output information;

wherein the plurality of possible program elements includes graphical user interface elements which are each selectable by the user to add a particular graphical user interface function associated with a particular graphical user interface element to the program.

32. The system of claim 29, wherein the plurality of possible program elements includes function elements each selectable by the user to add a particular computer-executable function associated with the particular function element to the program.

33. The system of claim 29, wherein, in said including the selected program element in the first window, the program instructions are further executable by the processor to:

receive user input to drag-and-drop the selected program element from the search window to the program.

34. The system of claim 29, wherein the user input in the search window specifying the one or more search criteria includes a search string, and wherein, in said identifying and displaying information regarding the plurality of possible program elements in the search window, the program instructions are further executable by the processor to:

search for the search string in a plurality of text items comprising text items related to the program elements; and display one or more text items located by said searching for the search string, wherein each of the one or more located text items includes the search string, and wherein each of the one or more located text items references one of the plurality of possible program elements;

wherein the user input selecting the program element from the plurality of possible program elements specifies one of the one or more located text items, wherein the specified located text item references the selected program element.

35. A system comprising:

a processor;

a memory which stores program instructions, wherein the memory is coupled to the processor;

an input device configured to receive user input, wherein the input device is coupled to the processor; and a display device, wherein the display device is coupled to the processor;

wherein the program instructions are executable by the processor to:

display in a graphical user interface on the display a first palette window from a hierarchy of palette windows, wherein one or more of the palette windows in the hierarchy comprise palette items that are selectable by a user to add functionality to a program; and wherein the first palette window comprises a search item;

receive user input selecting the search item of the first palette window;

display a search window in response to said user input selecting the search item;

receive user input to the search window specifying one or more search criteria;

identify and display information indicating a plurality of possible palette items in the search window in accordance with the one or more search criteria;

receive user input to the search window selecting a palette item from the plurality of possible palette items indicated in the search window; and include the selected palette item in the program in response to said receiving user input to the search window selecting the palette item.

36. The system of claim 35, wherein the program currently being edited is a graphical program which comprises a plurality of interconnected nodes that visually indicate functionality of the graphical program, wherein the palette items include icons that are selectable by the user to incorporate graphical user interface elements in a graphical user interface of the program, and wherein the palette items further include icons that are selectable by the user to include nodes in the graphical program.

37. The system of claim 35, wherein, in said including the selected palette item in the program, the program instructions are further executable by the processor to:

receive user input to drag-and-drop the selected palette item from the search window to the program.

38. The system of claim 35, wherein the user input to the search window specifying the one or more search criteria includes a search string, and wherein, in said identifying and displaying information regarding the plurality of possible palette items in the search window, the program instructions are further executable by the processor to:

search for the search string in a plurality of text items comprising text items related to the palette items; and display one or more text items located by said searching in the search window, wherein each of the one or more located text items includes the search string, and wherein each of the one or more located text items references one of the plurality of possible palette items;

wherein the user input selecting the palette item from the plurality of possible palette items specifies one of the one or more located text items in the search window, wherein the specified located text item references the selected palette item.

39. A system comprising:

a processor;

a memory which stores program instructions, wherein the memory is coupled to the processor;

an input device configured to receive user input, wherein the input device is coupled to the processor; and a display device, wherein the display device is coupled to the processor;

wherein the program instructions are executable by the processor to:

- display in a graphical user interface on the display a first palette window from a hierarchy of palette windows, wherein one or more of the palette windows in the hierarchy comprise palette items that are selectable by a user to include functionality in a program;
- receive user input selecting a search item of the first palette window;
- display a search window on the display in response to said user input selecting the search item;
- receive user input to the search window specifying a one or more search criteria;
- identify and displaying information indicating a plurality of possible palette windows in the search window in accordance with the one or more search criteria;
- receive user input selecting a second palette window from the plurality of possible palette windows; and
- display the second palette window on the display in response to said user input selecting the second palette window.

40. The system of claim 39, wherein said user input to the search window specifying the one or more search criteria includes a search string, and wherein, in said identifying and displaying information regarding the plurality of possible palette windows in the search window in accordance with the one or more search criteria, the program instructions are further executable by the processor to:

- search for the search string in a plurality of text items related to the palette windows in the hierarchy; and
- display one or more located text items in the search window, wherein each of the one or more located text items includes the search string, and wherein each of the one or more located text items references one of the plurality of possible palette windows;
- wherein the user input selecting the second palette window from the plurality of possible palette windows specifies one of the one or more located text items in the search window, wherein the specified located text item references the second palette window.

41. The system of claim 39, wherein the search window includes one or more navigation items for navigating among the hierarchy of palette windows, and wherein, prior to said displaying the search window in response to said user input selecting the search item, the program instructions are further executable by the processor to:

- receive user input selecting a navigation item displayed on the search window; and
- display a previously displayed palette window in the hierarchy of palette windows in response to said user input selecting the navigation item;
- wherein the navigation item is one of a forward navigation item, a back navigation item, and an up navigation item.

42. The system of claim 39, wherein the program is a graphical program which comprises a plurality of interconnected nodes that visually indicate functionality of the graphical program, and wherein the palette items include icons that are selectable by the user to add functionality to the graphical program.

43. The system of claim 39, wherein the information indicating the plurality of possible palette windows displayed in the search window includes information regarding one or more possible program elements, wherein the information regarding the one or more possible program elements is selectable by the user from the search window to add functionality to the program.

44. A memory medium comprising program instructions, wherein the program instructions are computer-executable to implement:

- displaying a program in a graphical user interface on a display of a computer system;
- displaying a search window on the display of the computer system;
- receiving user input to the search window specifying one or more search criteria;
- identifying and displaying information indicating a plurality of possible program elements in the search window in accordance with the one or more search criteria, wherein the plurality of possible program elements are selectable by the user from the search window to add functionality to the program;
- receiving user input to the search window selecting a program element from the plurality of possible program elements indicated in the search window; and
- including the selected program element in the program in response to said receiving user input to the search window selecting the program element;
- wherein the program instructions are further computer-executable to implement:
  - displaying a first palette window of a hierarchy of palette windows, wherein one or more of the palette windows in the hierarchy each comprises one or more palette items that represent one of the plurality of possible program elements; and
  - wherein the search window includes one or more navigation items for navigating among the hierarchy of palette windows, wherein the navigation items include one or more of a forward navigation item, a backward navigation item, and an up navigation item.

45. The carrier medium of claim 44, wherein said including the selected program element in the first window comprises receiving user input to drag-and-drop the selected program element from the search window to the program.

46. A carrier medium comprising program instructions, wherein the program instructions are computer-executable to implement:

- displaying a first palette window from a hierarchy of palette windows in a graphical user interface, wherein one or more of the palette windows in the hierarchy comprise palette items that are selectable by a user to add functionality to a program currently being edited in the graphical user interface, and wherein the first palette window comprises a search item;
- receiving user input selecting the search item of the first palette window;
- displaying a search window in response to said user input selecting the search item;
- receiving user input in the search window specifying one or more search criteria;
- identifying and displaying information indicating a plurality of possible palette items in the search window in accordance with the one or more search criteria;

receiving user input to the search window selecting a palette item from the plurality of possible palette items indicated in the search window; and including the selected palette item in the program in response to said receiving user input to the search window selecting the palette item.

47. The carrier medium of claim 46, wherein said including the selected palette item in the program comprises receiving user input to drag-and-drop the selected palette item from the search window to the program.

48. A carrier medium comprising program instructions, wherein the program instructions are computer-executable to implement:

displaying a first palette window from a hierarchy of palette windows in a graphical user interface, wherein one or more of the palette windows in the hierarchy comprise palette items that are selectable by a user to include functionality in a program currently being edited in the graphical user interface;

receiving user input selecting a search item of the first palette window;

displaying a search window in response to said user input selecting the search item;

receiving user input in the search window specifying one or more search criteria;

identifying and displaying information indicating a plurality of possible palette windows in the search window in accordance with the one or more search criteria;

receiving user input selecting a second palette window from the plurality of possible palette windows; and displaying the second palette window in response to said user input selecting the second palette window;

wherein the information indicating the plurality of possible palette windows displayed in the search window includes information regarding one or more possible program elements, wherein the information regarding the one or more possible program elements is selectable by the user from the search window to add functionality to the program.

49. A computer-implemented method for adding program elements to a program, the method comprising:

displaying the program in a graphical user interface on a display of a computer system;

displaying a search field on the display, wherein the search field is operable to receive user input;

receiving user input to the search field specifying one or more search criteria;

determining one or more program elements in correspondence with the one or more search criteria;

displaying information indicating the one or more program elements in correspondence with the one or more search criteria;

receiving user input to the search window selecting a program element of the one or more program elements indicated in the search window; and including the selected program element in the program in response to said receiving user input to the search window selecting the program element;

displaying a first palette window of a hierarchy of palette windows, wherein one or more of the palette windows in the hierarchy each comprises one or more palette items that represent one of the one or more program elements; and wherein the search window includes one or more navigation items for navigating among the hierarchy of palette windows, wherein the navigation items include one or more of a forward navigation item, a backward navigation item, and an up navigation item.

50. The method of claim 49, wherein the program is displayed in a first area of the display and the one or more program elements are displayed in a second area of the display;

wherein said including the selected program element in the program comprises receiving user input to drag-and-drop the selected program element from the second area to the first area.

51. The method of claim 49, wherein the program is displayed in a first window of the graphical user interface and the one or more program elements are displayed in a second window of the graphical user interface;

wherein said including the selected program element in the program comprises receiving user input to drag-and-drop the selected program element from the second window to the first window.

52. The method of claim 49, wherein at least one of the one or more program elements includes a graphical user interface program element.

53. The method of claim 49, wherein the program is a graphical program which comprises a plurality of interconnected nodes that visually indicate functionality of the graphical program.

54. The method of claim 53, wherein at least one of the one or more program elements includes a node which is operable to be interconnected with the plurality of interconnected nodes.

* * * * *